United States Patent [19]

Hasebe et al.

[11] Patent Number: 5,708,349
[45] Date of Patent: Jan. 13, 1998

[54] ALKALINE SECONDARY BATTERY MANUFACTURING METHOD, ALKALINE SECONDARY BATTERY POSITIVE ELECTRODE, ALKALINE SECONDARY BATTERY, AND A METHOD OF MANUFACTURING AN INITIALLY CHARGED ALKALINE SECONDARY BATTERY

[75] Inventors: Hiroyuki Hasebe, Chigasaki; Shinji Tsuruta; Hideki Yoshida, both of Yokohama; Masaaki Yamamoto, Inzaimachi; Ken-ichi Kanno; Kiyoshi Ishitsuka, both of Yokohama; Ken Komiyama, Musashimurayama; Hidekazu Oppata, Tokyo, all of Japan

[73] Assignees: Kabushiki Kaisha Toshiba, Kawasaki; Toshiba Battery Co., Ltd., Tokyo, both of Japan

[21] Appl. No.: 604,795

[22] Filed: Feb. 23, 1996

[30] Foreign Application Priority Data

Feb. 23, 1995 [JP] Japan ................... 7-035634
Feb. 23, 1995 [JP] Japan ................... 7-035635
Feb. 24, 1995 [JP] Japan ................... 7-037125

[51] Int. Cl.⁶ .......................... H01M 10/44; H01M 4/32
[52] U.S. Cl. .................. 320/21; 320/15; 320/2; 320/5; 429/223; 429/52; 29/623.5
[58] Field of Search .................. 320/2, 21, 15, 320/5; 429/59, 52, 57, 223; 29/623.1, 623.5; 205/57, 60

[56] References Cited

U.S. PATENT DOCUMENTS

| | | | |
|---|---|---|---|
| Re. 34,752 | 10/1994 | Oshitani et al. | 429/223 |
| 5,356,732 | 10/1994 | Terasaka et al. | 320/21 X |
| 5,366,831 | 11/1994 | Watada et al. | 429/223 |
| 5,395,712 | 3/1995 | Furukawa | 429/223 X |
| 5,405,719 | 4/1995 | Sonoda et al. | 429/223 |
| 5,435,055 | 7/1995 | Furukawa | 29/623.5 |
| 5,466,543 | 11/1995 | Ikoma et al. | 429/223 X |
| 5,489,314 | 2/1996 | Bogauchi et al. | 29/623.5 |
| 5,571,636 | 11/1996 | Ohta et al. | 429/223 X |

FOREIGN PATENT DOCUMENTS 5-314983  11/1993  Japan.

Primary Examiner—Peter S. Wong
Assistant Examiner—K. Shin
Attorney, Agent, or Firm—Oblon, Spivak, McClelland, Maier & Neustadt, P.C.

[57] ABSTRACT

Disclosed is a method of manufacturing an alkaline secondary battery improved in the positive electrode utilization, the large-current discharge characteristic, the discharge capacity, and the capacity recovery ratio after storage. This method of manufacturing an alkaline secondary battery comprising a positive electrode containing a nickel compound and a cobalt compound, a negative electrode and an alkaline electrolyte, the method comprising the step of performing initial charging which comprises a charging process of supplying a current I (mA) satisfying the following Inequality (1):

$$50 < (T \times C^2)/(I \times S) < 2000 \qquad (1)$$

where C is a electrochemical capacity (mAh) of the cobalt compound contained in the positive electrode, which is calculated on the basis of a electrochemical equivalent of the cobalt compound, T is a temperature (°C.) at which the charging process is performed, and S is an area (cm²) of the positive electrode.

36 Claims, 3 Drawing Sheets

ALKALINE SECONDARY BATTERY MANUFACTURING METHOD, ALKALINE SECONDARY BATTERY POSITIVE ELECTRODE, ALKALINE SECONDARY BATTERY, AND A METHOD OF MANUFACTURING AN INITIALLY CHARGED ALKALINE SECONDARY BATTERY

BACKGROUND OF THE INVENTION

1. Field of the Invention

The present invention relates to a method of manufacturing an alkaline secondary battery, a positive electrode for an alkaline secondary battery, an alkaline secondary battery, and a method of manufacturing an initially charged alkaline secondary battery.

2. Description of the Related Art

With increasing development of low-power devices brought about by recent progress of electronic technologies and with progress of packaging technologies, portable electronic apparatuses which have hitherto been considered impossible to realize are now being put into practical use. These portable electronic apparatuses require large-capacity secondary batteries as power supplies incorporated into them. As secondary batteries meeting this requirement, nickel-cadmium secondary batteries which include a paste type electrode formed by filling a three-dimensional structure substrate with a paste containing an active material and nickel-hydrogen secondary batteries which use a negative electrode containing a hydrogen-absorbing alloy in place of a cadmium electrode are being developed and put on the market. In particular, the demand for nickel-hydrogen secondary batteries which include a negative electrode containing a hydrogen-absorbing alloy has rapidly increased in recent years, since the batteries can achieve a large capacity approximately at least twice that of nickel-cadmium secondary batteries and do not contain environmental pollutants such as cadmium.

The secondary batteries described above, however, do not satisfactorily meet the recent rapid progress of electronic apparatuses and the needs of users of these electronic apparatuses. In particular, to meet the demand for a larger capacity, it is of urgent necessity to develop a countermeasure which improves a pulse large-current discharge characteristic resulting from the progress of digital apparatuses.

The typically known conventional countermeasures for improving the large-current characteristic are to increase the content of a cobalt compound to be added to a positive electrode and to increase the porosity of a positive electrode. Unfortunately, these countermeasures lead to a decrease in the capacity of a secondary battery. Accordingly, it is difficult to improve the large-current discharge characteristic without sacrificing a large capacity.

As a specific problem of the recent electronic apparatuses, on the other hand, it is also imperative to develop a countermeasure which prevents a decrease in the capacity of a battery when, e.g., the driving power supply of a memory content holding circuit of a portable small-sized computer is continuously discharged by a weak current after the power switch is turned off or when a battery is left unused for long periods of time. It is unfortunate that no solutions are currently available for this kind of a problem because the problem has been uncovered only recently.

Jpn. Pat. Appln. KOKAI Publication No. 5-314983 describes a method of manufacturing an alkaline secondary battery, in which nickel hydroxide is used as a positive electrode active material, a positive electrode contains a calcium compound, and initial charge is performed at a temperature from 40° C. to 70° C. An embodiment in this KOKAI Publication describes the manufacture of an alkaline secondary battery done by the following method. That is, a powder which is formed by weighing nickel hydroxide, metal cobalt, cobalt hydroxide, and calcium hydroxide at a weight ratio of 100:7:5:2.5 is well mixed, and 25 wt % of water are added to 20 g of the powder mixture to form a paste. The paste is filled in foamed nickel having dimensions of 60 mm by 81 mm and a weight of 3.1 g and dried. The resultant material is compressed into a thickness of 1.74 mm, thereby forming a positive electrode plate. A nickel plate as a lead is spot-welded to a corner of the positive electrode plate to obtain a positive electrode plate with a theoretical capacity of 5.05 Ah. Test batteries assembled using five these positive electrode plates are subjected to initial charge in which these batteries are charged at temperatures of 40° C., 50° C., 60° C., and 70° C. with a current of 2.53 A (0.1 C) for 15 hours, thereby manufacturing batteries. Note that 0.1 C indicates a current value by which the capacity of a battery can be completely discharged within ten hours.

SUMMARY OF THE INVENTION

It is an object of the present invention to provide an alkaline secondary battery manufacturing method which can simultaneously achieve a large capacity, improve the large-current discharge characteristic, and suppress a decrease in the capacity after the battery is left unused for long periods of time, a positive electrode for an alkaline secondary battery, and an alkaline secondary battery.

It is another object of the present invention to provide an initially charged alkaline secondary battery manufacturing method which includes a high-temperature initial charge step capable of effectively utilizing thermal energy.

A method of manufacturing an alkaline secondary battery comprising a positive electrode containing a nickel compound and a cobalt compound, negative electrode and an alkaline electrolyte according to the present invention comprises the step of performing initial charging which comprises a charging process of supplying a current I (mA) satisfying the following Inequality (1):

$$50 < (T \times C^2)/(I \times S) < 2000 \qquad (1)$$

where C is an electrochemical capacity (mAh) of the cobalt compound contained in the positive electrode, which is calculated on the basis of an electrochemical equivalent of the cobalt compound, T is a temperature (°C.) at which the charging process is performed, and S is an area (cm²) of the positive electrode.

Another method of manufacturing an alkaline secondary battery comprising a positive electrode containing a nickel compound and a cobalt compound, a negative electrode and an alkaline electrolyte according to the present invention comprises the step of performing initial charging which comprises a charging process of supplying a current I (mA) satisfying the following Inequality (1), and a process of lowering a temperature after a charged electricity quantity Q (mAh) reaches a range of Inequality (2) below:

$$50 < (T \times C^2)/(I \times S) < 2000 \qquad (1)$$

$$0.1 < Q/C < 3 \qquad (2)$$

where C is an electrochemical capacity (mAh) of the cobalt compound contained in the positive electrode, which is calculated on the basis of an electrochemical equivalent of the cobalt compound, T is a temperature (°C.) at which the charging process is performed, and S is an area (cm$^2$) of the positive electrode.

Still another method of manufacturing an alkaline secondary battery comprising a positive electrode containing a nickel compound and a cobalt compound, a negative electrode and an alkaline electrolyte according to the present invention comprises the step of performing initial charging which comprises a charging process of supplying a current I (mA) satisfying the following Inequality (1), and a process of increasing the current after a charged electricity quantity Q (mAh) reaches a range of Inequality (2) below:

$$50<(T\times C^2)/(I\times S)<2000 \qquad (1)$$

$$0.1<Q/C<3 \qquad (2)$$

where C is an electrochemical capacity (mAh) of the cobalt compound contained in the positive electrode, which is calculated on the basis of an electrochemical equivalent of the cobalt compound, T is a temperature (°C.) at which the charging process is performed, and S is an area (cm$^2$) of the positive electrode.

Still another method of manufacturing an alkaline secondary battery comprising a positive electrode containing a nickel compound and a cobalt compound, a negative electrode and an alkaline electrolyte according to the present invention comprises the step of performing initial charging which comprises a charging process of supplying a current I (mA) satisfying the following Inequality (1), and a process of lowering a temperature and increasing the current after a charged electricity quantity Q (mAh) reaches a range of Inequality (2) below:

$$50<(T\times C^2)/(I\times S)<2000 \qquad (1)$$

$$0.1<Q/C<3 \qquad (2)$$

where C is an electrochemical capacity (mAh) of the cobalt compound contained in the positive electrode, which is calculated on the basis of an electrochemical equivalent of the cobalt compound, T is a temperature (°C.) at which the charging process is performed, and S is an area (cm$^2$) of the positive electrode.

An alkaline secondary battery positive electrode according to the present invention contains a nickel compound and a cobalt compound, wherein assuming that the cobalt compound is cobalt oxyhydroxide and an electrochemical capacity of the cobalt oxyhydroxide calculated on the basis of an electrochemical equivalent of the cobalt oxyhydroxide is C (mAh), when the positive electrode is discharged with a current value of C/100 (mA), the positive electrode has a discharge capacity of C/20 (mAh) or more while a potential decreases from 200 mV to −200 mV with respect to a mercury/mercuric oxide reference electrode.

An alkaline secondary battery according to the present invention comprises a positive electrode containing a nickel compound and a cobalt compound, a negative electrode, and an alkaline electrolyte, wherein assuming that the cobalt compound is cobalt oxyhydroxide and an electrochemical capacity of the cobalt oxyhydroxide calculated on the basis of an electrochemical equivalent of the cobalt oxyhydroxide is C (mAh), when the positive electrode is discharged with a current value of C/100 (mA), the positive electrode has a discharge capacity of C/20 (mAh) or more while a potential decreases from 200 mV to −200 mV with respect to a mercury/mercuric oxide reference electrode.

Another alkaline secondary battery according to the present invention comprises a positive electrode containing a nickel compound and a cobalt compound, a negative electrode, and an alkaline electrolyte, wherein assuming that the cobalt compound is cobalt oxyhydroxide, when the battery is discharged at 45° C. by causing a short using a 2-Ω resistance, the battery has a quantity of electricity which flows while a voltage decreases from 100 mV to 20 mV and which is 20% or more of an electrochemical capacity of the cobalt oxyhydroxide calculated on the basis of an electrochemical equivalent of the cobalt oxyhydroxide.

Still another alkaline secondary battery according to the present invention comprises a positive electrode containing a nickel compound and a cobalt compound, a negative electrode, and an alkaline electrolyte, wherein the battery has a recovery voltage which rises from 10 mV to 30 mV within one hour or less after the battery has been discharged at 45° C. by causing a short using a 2-Ω resistance for 48 hours and rendered not short-circuited at 25° C.

Still another method of manufacturing an initially charged alkaline secondary battery according to the present invention comprises the steps of preparing an alkaline secondary battery comprising a positive electrode containing a nickel compound and a cobalt compound, a negative electrode and an alkaline electrolyte, performing initial charging of the battery at a high temperature of 40° to 120° C., and performing heat exchange between the initially charged battery and a battery to be initially charged, thereby cooling the initially charged battery and heating the battery to be initially charged.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

A method of manufacturing an alkaline secondary battery according to the present invention will be described in detail below with reference to the accompanying drawings.

Figure 1:
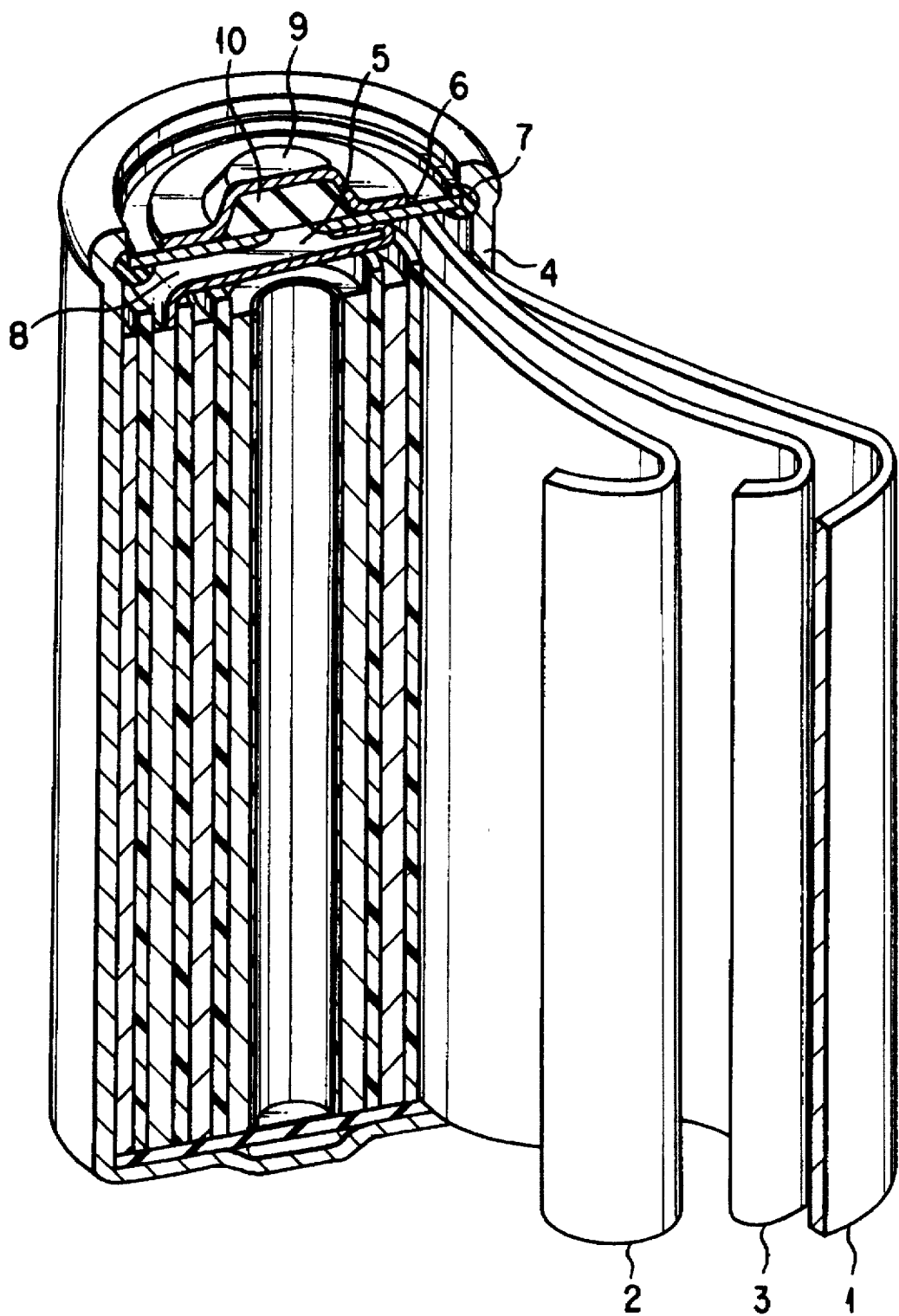
FIG. 1 is a partially exploded perspective view showing an alkaline secondary battery according to the present invention.

FIG. 1 is a partially cutaway perspective view showing a cylindrical alkaline secondary battery after being assembled and before being subjected to an initial charge step. A negative electrode 1 is spirally wound with a separator 3 interposed between the negative electrode 1 and a positive electrode 2, and the resultant structure is accommodated in a closed-end cylindrical case 4. An alkaline electrolyte is also contained in the case 4. A circular sealing plate 6 having a hole 5 in its center is arranged in the upper opening of the case 4. A ring-like insulating gasket 7 is arranged between the peripheral edge of the sealing plate 6 and the inner surface of the upper opening of the case 4. The sealing plate 6 is hermetically fixed to the case 4 via the gasket 7 by caulking by which the diameter of the upper opening is reduced toward the inside. One end of a positive electrode lead 8 is connected to the positive electrode 2, and its other end is connected to the lower surface of the sealing plate 6. A hat-like positive electrode terminal 9 is mounted on the sealing plate 6 so as to cover the hole 5. A rubber safety valve 10 is arranged in the space surrounded by the sealing plate 6 and the positive electrode terminal 9 so as to close the hole 5.

Details of the negative electrode 1, the positive electrode 2, the separator 3, and the alkaline electrolyte will be described below.

1) Negative electrode 1

This negative electrode contains, e.g., a hydrogen-absorbing alloy powder which absorbs and releases hydrogen. A negative electrode of this type is formed by coating a collector with a paste containing the hydrogen-absorbing alloy powder and a binder.

The hydrogen-absorbing alloy blended in the paste is not particularly limited. For example, all of so-called $AB_5$, $A_2B$, AB, $AB_3$, and $AB_2$ alloys can be used. More specifically, as the hydrogen-absorbing alloy it is possible to use $LaNi_5$, $MmNi_5$ (Mm; misch metal), $LmNi_5$ (Lm; lanthanum-enriched misch metal), and multi-element alloys of these Ni-based alloys in which some Ni are replaced with an element such as Al, Mn, Co, Ti, Cu, Zn, Zr, Cr, or B; and TiNi- and TiFe-based alloys. Of these alloys, the use of an alloy represented by $RNi_{t-x-y}Co_xA_y$ (wherein R represents at least one element selected from the group consisting of rare earth elements containing La and Y, A represents at least one element selected from the group consisting of Al, Mn, Ti, Cu, Zn, Zr, Cr, and P and $t$, $x$, and $y$ represent the atomic ratios satisfying $4.5 \leq t \leq 5.5$, $x \geq 0.4$, and $0 \leq y \leq 2.0$, respectively) is preferable.

In a hydrogen-absorbing alloy represented by $RNi_{t-x-y}Co_xA_y$, if the atomic ratio of x is smaller than 0.4, not only it is impossible to sufficiently achieve the effect of suppressing any decrease in the battery capacity after stand, but also the corrosion resistance of the hydrogen-absorbing alloy itself cannot be improved. To suppress the rise of an initial activation capacity, the upper limit of x is preferably 2.0. If the atomic ratio of the substitution amount of y exceeds 2.0, the nickel content decreases, and this discourages the catalytic action of the hydrogen-absorbing alloy itself. As a result, the capacity decreases or the voltage drops. It is particularly preferable to select Mn and Al as A. Also, to improve the charge/discharge cycle life of the secondary battery, it is preferable that R be a misch metal consisting of 5 to 95 wt % of La, 5 to 50 wt % of Nd, 5 to 50 wt % of Pr, and 0 to 60 wt % of Ce.

An alkaline secondary battery which includes a negative electrode containing a hydrogen-absorbing alloy represented by $RNi_{t-x-y}Co_xA_y$ and a positive electrode containing a nickel compound and a cobalt compound has not only a long life but a large capacity and an excellent large-current discharge characteristic. Therefore, it is possible to suppress any decrease in the capacity after stand. The reason for this is considered that the alloy has a composition containing a lot of cobalt component and so the alloy elutes this cobalt component into an alkaline electrolyte during initial charge, contributing to formation of cobalt oxyhydroxide in the positive electrode. As a consequence, the utilization of the positive electrode is improved.

Examples of the binder blended in the paste are a polyacrylate such as sodium polyacrylate and potassium polyacrylate, rubber polymers such as styrene-butadiene rubber (SBR), a fluorine-based resin such as polytetrafluoroethylene (PTFE), polyvinylalcohol, and carboxymethylcellulose. Any of these binders is preferably blended in an amount of 0.1 to 5 parts by weight with respect to 100 parts by weight of the hydrogen-absorbing alloy.

The paste can also contain a conductor such as metal powder, carbon black or graphite where necessary. This conductor is preferably blended in an amount of 0.1 to 4 parts by weight with respect to 100 parts by weight of the hydrogen-absorbing alloy powder.

As the collector, it is possible to use a three-dimensional substrate such as a foamed nickel substrate, a mesh-like sintered metal fiber substrate, or a felt-plated substrate formed by plating nickel on nonwoven fabric, or a two-dimensional substrate such as a punched metal or an expanded metal.

As the negative electrode 1, a cadmium electrode containing cadmium oxide can also be used in place of the hydrogen-absorbing alloy electrode described above.

2) Nickel positive electrode 2

This positive electrode has a composition containing a nickel compound and a cobalt compound. A paste type positive electrode of this sort is manufactured by a paste method in which a paste is prepared by kneading, e.g., a nickel hydroxide powder as the nickel compound, a cobalt compound powder, and a binder in the presence of water, and the resultant paste is filled in a collector, dried, and pressed.

The nickel hydroxide powder preferably has a spherical shape or a shape similar to a spherical shape.

Examples of the cobalt compound are cobalt monoxide, cobalt hydroxide, and metal cobalt. The cobalt compound is preferably contained at a ratio of 2 to 20 wt %, as a cobalt amount, with respect to the nickel hydroxide.

As the binder, it is possible to use carboxymethylcellulose, a polyacrylate, polytetrafluoroethylene, or polyvinylalcohol.

As the collector, it is possible to use a three-dimensional substrate such as a foamed nickel substrate, a mesh-like sintered metal fiber substrate, or a felt-plated substrate formed by plating nickel on nonwoven fabric, or a two-dimensional substrate such as a punched metal or an expanded metal.

3) Separator 3

The separator 3 is made from polymeric nonwoven fabric such as polypropylene nonwoven fabric, nylon nonwoven fabric, or nonwoven fabric formed by mixing polypropylene fibers and nylon fibers. In particular, polypropylene nonwoven fabric whose surface is given hydrophilic nature is suitable as the separator.

4) Alkaline electrolyte

As this alkaline electrolyte, it is possible to use, e.g., a solution mixture of sodium hydroxide (NaOH) and lithium hydroxide (LiOH), a solution mixture of potassium hydroxide (KOH) and LiOH, or a solution mixture of NaOH, KOH, and LiOH.

The alkaline secondary battery, FIG. 1, having the above structure is initially charged. This initial charging comprises a charging process satisfying the following Inequality (1):

$$50 < (T \times C^2)/(I \times S) < 2000 \quad (1)$$

where C is the electrochemical capacity (mAh) of the cobalt compound contained in the positive electrode, which is calculated on the basis of the electrochemical equivalent of the cobalt compound, T is the temperature (°C.) at which the charging process is performed, and S is the area (cm$^2$) of the positive electrode.

Details of the method of obtaining the electrochemical capacity (mAh) of the cobalt compound contained in the positive electrode, which is calculated on the basis of the electrochemical equivalent of the cobalt compound, will be described below. Assuming 7 g of nickel hydroxide and 0.7 g of cobalt monoxide are contained in the positive electrode, the electrochemical capacity C (mAh) of the cobalt monoxide is calculated as follows. Since the valence of cobalt of cobalt monoxide (CoO) is +2 and the valence of cobalt of cobalt oxyhydroxide (CoOOH) which is the form of cobalt upon charge is +3, a change in the valence of cobalt monoxide caused by charge is 1. Similarly, changes in the valences of cobalt hydroxide and metal cobalt are 1 and 3, respectively. When these valance changes and the fact that the molecular weight of cobalt monoxide is 74.9 are taken into consideration, it is obvious that an electrochemical capacity necessary to oxidize one mole, i.e., 74.9 g, of cobalt monoxide is 26,806 mAh. Analogously, 92.9 g of cobalt hydroxide correspond to 26,806 mAh, and 58.9 g of metal cobalt correspond to 3×26,806 mAh, i.e., 80,418 mAh. Accordingly, the electrochemical capacity of 0.7 g of cobalt monoxide is 250 mAh.

The term "initial charging" means charging is first performed after assembling a secondary battery. The initial charging comprises the charging process of supplying a current I (mA) satisfying the following Inequality (1).

In the initial charging step, the nickel compound is normally charged after the cobalt compound is charged. The charging process needs only to be performed, in the early stages of initial charging i.e., before a cobalt compound having an electron conductivity is uniformly produced in an amount effective to contribute to conduction in the positive electrode. However, charge of the nickel compound done after that can also be performed in accordance with the condition of Inequality (1).

The charging process in which the current I (mA) satisfies the condition of Inequality (1) is preferably performed until at least a charged electricity quantity Q (mAh) reaches the range of Inequality (2) below:

$$0.1 < Q/c < 3 \quad (2)$$

where C is the electrochemical capacity (mAh) of the cobalt compound contained in the positive electrode, which is calculated on the basis of the electrochemical equivalent of the cobalt compound.

When the charged electricity quantity Q (mAh) rises to the range of Inequality (2), cobalt oxyhydroxide in an amount effective to contribute to conduction is uniformly formed in the positive electrode.

If the current value in the charging process is larger than the value calculated by Inequality (1), the nickel hydroxide as an active material of the positive electrode is charged as a competitive reaction at the same time as the cobalt compound in the positive electrode is charged. This makes it difficult to sufficiently oxidize the cobalt compound and also makes the form of the charged product of the cobalt compound inadequate as a positive electrode. On the other hand, if the current value in the charging process is smaller than the value calculated by Inequality (1), the form of the charged product of the cobalt compound becomes inadequate as a positive electrode again. Also, the time required for the initial charge is prolonged to lower the productivity. The current I (mA) in the charging process is preferably the value calculated from $200 < (T \times C^2)/(I \times S) < 2000$.

The temperature in the charging process is preferably 40° to 120° C. If the charging process temperature is lower than 40° C., it becomes difficult to uniformly form an enough amount of cobalt oxyhydroxide functioning as a conducting path in the positive electrode. If the charging process temperature exceeds 120° C., the charge efficiency significantly decreases to encourage generation of oxygen, and as a consequence cobalt is chemically oxidized. In addition, it becomes difficult to uniformly form an enough amount of cobalt oxyhydroxide in the positive electrode. Also, the vapor pressure of the electrolyte rises, and this may activate the safety valve or thermally deteriorate the components of the battery, significantly lowering the battery reliability. The temperature in the charging process is more preferably 40° to 90° C.

In the alkaline secondary battery manufacturing method according to the present invention described above, an electrode group is formed by insulating a paste type positive electrode containing a nickel compound and a cobalt compound from a negative electrode by interposing a separator between them. After a closed case containing the electrode group and an alkaline electrolyte is formed, initial charging is performed. The initial charging comprises a charging process which supplies the current in a specific condition calculated from Inequality (1) above. Consequently, it is possible to simultaneously achieve the three objectives described previously, i.e., obtain a large capacity, improve the large-current discharge characteristic, and suppress a decrease in the capacity after stand. Although the reason why these objectives can be achieved is unclear, it is assumed that the following mechanism is functioning.

That is, cobalt oxyhydroxide formed in the paste type positive electrode has an electron conductivity and therefore electrically interconnects components of the active material of nickel hydroxide having an insulation performance and also electrically connects the nickel hydroxide with the collector. As a result, the electrical conductivity of the nickel hydroxide with respect to the collector is ensured, and this improves the utilization of the nickel hydroxide and the large-current discharge characteristic. Also, this strong conduction suppresses a decrease in the capacity after stand. The improvements of these characteristics, therefore, depend upon the form of cobalt oxyhydroxide existing in the positive electrode and the effective amount of cobalt oxyhydroxide contributing to the conduction.

$\{(T \times C^2)/(I \times S)\}$ calculated from the initial charge conditions, C=9630 mAh, S=243 cm$^2$, I=2530 mAh, and T=40° to 70° C., in the conventional alkaline secondary battery manufacturing method described in KOKAI Publication described previously is 6,000 to 10,500 which is higher than the upper-limit value. In this conventional method, therefore, the initial charge conditions fall outside the range of Inequality (1) above, and so the distribution of cobalt oxyhydroxide in the positive electrode becomes non-uniform. Additionally, the amount of cobalt oxyhydroxide contributing to conduction becomes insufficient to lead to a fall in utilization of the positive electrode. The result is, for example, a decrease in the capacity after stand.

In the present invention, however, an alkaline secondary battery including a paste type positive electrode is subjected to initial charge which comprises the charging process. The current in the charging process is defined to meet the specific condition calculated from Inequality (1) above. Consequently, the cobalt compound in the positive electrode dissolves into the alkaline electrolyte and subsequently reprecipitates on the surface of nickel hydroxide, and the reprecipitated cobalt compound is oxidized (cobalt oxyhydroxide is produced) by the charging current. It is considered that since all these processes smoothly progress in proper quantities, cobalt oxyhydroxide is uniformly produced in an amount effective to contribute to conduction in the positive electrode, and as a consequence the utilization of nickel hydroxide and the large-current discharge characteristic can be improved.

Inequality (1) above includes the positive electrode area S which indicates C/S, i.e., the amount of a cobalt compound per unit electrode area. When this value is large, i.e., when the concentration of cobalt per unit positive electrode area is high, dissolution and reprecipitation of the cobalt compound are promoted. Consequently, even if the charging current is large, it is possible to smoothly progress the dissolution of the cobalt compound in the positive electrode into the alkaline electrolyte, the subsequent reprecipitation of the cobalt compound onto the surface of nickel hydroxide, and the oxidation of the reprecipitated cobalt compound by the charging current, in their respective proper quantities.

Accordingly, the present invention experimentally and theoretically clarifies the initial charge condition under which the cobalt compound contained in the positive electrode more effectively functions. This condition is affected by the four factors: the electrochemical capacity calculated from the electrochemical equivalent of the cobalt compound contained in the paste type positive electrode, the area of the positive electrode, the charging temperature, and the charging current. Only when initial charge is performed under the conditions meeting Inequality (1) above, it is possible to increase the effective amount of the nickel hydroxide active materials contained in the positive electrode, by which electrical conduction is obtained by cobalt oxyhydroxide.

Another method of manufacturing an alkaline secondary battery according to the present invention comprises the steps of forming an electrode group by insulating a positive electrode containing a nickel compound and a cobalt compound from a negative electrode by interposing a separator therebetween, forming a closed case containing the electrode group and an alkaline electrolyte, and performing initial charging, wherein the initial charging comprises a charging process of satisfying a condition of Inequality (1) below, and a process of lowering the temperature, increasing the current, or lowering the temperature and increasing the current after a charged electricity quantity Q (mAh) reaches a range of Inequality (2) below:

$$50 < (T \times C^2)/(I \times S) < 2000 \quad (1)$$

$$0.1 < Q/C < 3 \quad (2)$$

where I is the current (mA), C is the electrochemical capacity (mAh) of the cobalt compound contained in the positive electrode, which is calculated on the basis of the electrochemical equivalent of the cobalt compound, T is the temperature (°C.) in the charging process, and S is the area (cm$^2$) of the positive electrode.

It is preferable that after the charged electricity quantity Q (mAh) reached the range of Inequality (2) above, the temperature and the current value be so altered as to meet the conditions under which the nickel compound is sufficiently charged.

In this alkaline secondary battery manufacturing method according to the present invention, it is possible to simultaneously achieve the three objectives described previously, i.e., obtain a large capacity, improve the large-current discharge characteristic, and suppress a decrease in the capacity after stand. Additionally, it is possible to suppress deterioration of the battery components such as the negative electrode, the separator, and the electrolyte. The deterioration of the battery components includes heat deterioration occurring when the secondary battery is excessively exposed to a high-temperature atmosphere, and deterioration in the characteristics of the negative electrode occurring when the secondary battery is initially charged for long periods of time, for example, corrosion of the hydrogen-absorbing alloy negative electrode and, in the case of a cadmium negative electrode, formation of cadmium hydroxide which does not contribute to charge/discharge.

When the charged electricity quantity Q (mAh) reaches the range of Inequality (2) above in the initial charge step, cobalt oxyhydroxide is uniformly produced in an amount effective to contribute to conduction in the positive electrode. In a part of the initial charge step after the charged electricity quantity reached the range of Inequality (2), the temperature can be lowered compared to that before the reach. Consequently, deterioration in the characteristics of the negative electrode can be suppressed. If the charging process temperature is high, it is also possible to prevent the components such as the negative electrode, the separator, and the electrolyte from being excessively exposed to a high-temperature atmosphere, thereby reducing heat deterioration.

The part of the initial charge step after the charged electricity quantity Q reached the range of Inequality (2) can be rapidly completed by increasing the current value. Accordingly, since the initial charge step can be shortened, it is possible not only to suppress deterioration in the characteristics of the negative electrode but also to improve the productivity. If the charging process temperature is high, it is also possible to shorten the time during which the components such as the negative electrode, the separator, and the electrolyte are exposed to the high temperature, thereby reducing heat deterioration of these components.

In the part of the initial charge step after the charged electricity quantity Q reached the range of Inequality (2), by lowering the temperature and increasing the current value compared to those in the charge before the reach, it is naturally possible to greatly reduce deterioration in the characteristics of the negative electrode and improve the productivity. This makes it possible to further reduce heat deterioration of the battery components resulting from an elevated initial charge temperature.

Accordingly, it is possible to manufacture an alkaline secondary battery which has a large capacity and an improved large-current discharge characteristic, in which a decrease in the capacity after stand is suppressed, and which also has a high reliability.

An alkaline secondary battery positive electrode according to the present invention contains a nickel compound and a cobalt compound, wherein assuming that the cobalt compound is cobalt oxyhydroxide and the electrochemical capacity of the cobalt oxyhydroxide calculated on the basis of the electrochemical equivalent of the cobalt oxyhydroxide is C (mAh), when discharge is performed with a current value of C/100 (mA), the positive electrode has the discharge capacity of C/20 (mAh) or more while the potential decreases from 200 mV to −200 mV with respect to a mercury/mercuric oxide (Hg/HgO) reference electrode.

If the potential from which the calculation of the discharge capacity is started exceeds 200 mV, discharge of the cobalt compound in the positive electrode is insufficient. Consequently, the discharged electricity quantity of the nickel compound also is measured in addition to the discharged electricity quantity of the cobalt compound (cobalt oxyhydroxide). As a result, it becomes difficult to accurately measure the amount of cobalt oxyhydroxide in the positive electrode. On the other hand, if the potential at which the calculation of the discharge capacity is stopped is lower than −200 mV, hydrogen is produced simultaneously with discharge of cobalt oxyhydroxide. As a consequence, the quantity of electricity of the production of hydrogen also is measured in addition to the discharged electricity quantity of cobalt oxyhydroxide. Accordingly, it becomes difficult to accurately measure the amount of cobalt oxyhydroxide in the positive electrode.

If the discharge capacity while the potential decreases from 200 mV to −200 mV with respect to the mercury/mercuric oxide reference electrode is lower than C/20 (mAh), it is no longer possible to simultaneously achieve the three objectives described previously, i.e., obtain a large capacity, improve the large-current discharge characteristic, and suppress a decrease in the capacity after stand. A more preferable positive electrode has a discharge capacity of C/10 (mAh) or more when discharge is performed under the conditions described above. A positive electrode meeting this condition can greatly improve the capacity, the large-current discharge characteristic, and the capacity recovery ratio after stand. The greater the discharge capacity, the better. The most preferable positive electrode is one which has a maximum discharge capacity of C (mAh) when discharge is performed under the conditions described above.

The alkaline secondary battery according to the present invention comprises an electrode group accommodated in a closed case and formed by insulating a positive electrode, which contains a nickel compound and a cobalt compound and has a discharge capacity of C/20 (mAh) or more under the above-mentioned specific conditions, from a negative electrode by interposing a separator between them, and an alkaline electrolyte contained in the closed case. The positive electrode has preferably a discharge capacity of C/10 (mAh) or more under the above-mentioned specific conditions. The most preferable positive electrode is one which has a maximum discharge capacity of C (mAh).

This alkaline secondary battery is manufactured as follows. That is, an electrode group is formed by insulating a positive electrode containing a nickel compound and a cobalt compound from a negative electrode by interposing a separator between them and accommodated in a closed case. Examples of the cobalt compound are cobalt monoxide, cobalt hydroxide, and metal cobalt. An alkaline electrolyte is contained in the closed case to assemble a secondary battery. After the battery is left to stand for a time by which the electrolyte sufficiently penetrates into the electrode group, initial charge is performed in accordance with one of methods 1) to 4) described below. By this initial charge, the cobalt compound contained in the positive electrode is turned into a cobalt compound containing cobalt oxyhydroxide.

The positive electrode, negative electrode, separator, and alkaline electrolyte used are analogous to those explained in the alkaline secondary battery manufacturing methods described previously.

1) Weak current charging

Initial charge is performed such that at least the charging in the early stages is done with a current value by which the electrochemical capacity calculated from the electrochemical equivalent of the cobalt compound contained in the positive electrode can be discharged within one hour. Alternatively, the charging may be done with a lower current.

2) Intermittent charging

Initial charge is performed such that at least charge in the early stages is done by repeating an operation, in which charge is performed with a small electricity quantity and paused, a plurality of number of times.

3) High-temperature charging

Initial charge is performed such that at least charge in the early stages is done by raising the battery temperature to a high temperature (e.g., 40° to 120° C.).

4) Initial charge comprises a charging process satisfying the following Inequality (1);

$$0<(T \times C^2)/(I \times S)<2000.$$

The alkaline secondary battery according to the present invention includes a positive electrode containing a nickel compound and a cobalt compound and having a discharge capacity of C/20 or more under the above-mentioned specific conditions. Consequently, it is possible to simultaneously achieve the three objectives described previously, i.e., obtain a large capacity, improve the large-current discharge characteristic, and suppress a decrease in the capacity after stand. Although the reason why these objectives can be achieved is unclear, it is assumed that the following mechanism is functioning.

That is, a potential corresponding to oxidation-reduction (divalent→trivalent, divalent←trivalent) of the cobalt compound in the positive electrode exists between positive electrode potentials of 200 mV and −200 mV with respect to the mercury/mercuric oxide reference electrode. Assuming that the cobalt compound contained in the positive electrode is cobalt oxyhydroxide and the electrochemical capacity of the cobalt oxyhydroxide calculated from its electrochemical equivalent is C (mAh), a discharge capacity of C/20 (mAh) or more is obtained between these potentials when the positive electrode is discharged with a current value of C/100 (mA). It is considered that these facts indicate that, of the cobalt oxyhydroxide, cobalt oxyhydroxide electrically conducting to a conductor such as a collector exists in an amount larger than that defined by C/20 (mAh).

Also, since in the positive electrode nickel hydroxide particles having an insulation performance are electrically connected by cobalt oxyhydroxide used as a cobalt compound having an electrical conductivity, the utilization of the nickel hydroxide active material is improved.

Accordingly, the present invention has found that assuming the cobalt compound contained in the positive electrode is cobalt oxyhydroxide and the electrochemical capacity of the cobalt oxyhydroxide calculated from its electrochemical equivalent is C (mAh), when the positive electrode is discharged with a current value of C/100 (mA), the amount of nickel hydroxide that electrically connects with a conductor such as a collector by cobalt oxyhydroxide can be defined by a discharge capacity while the positive electrode potential decreases from 200 mV to −200 mV with respect to the mercury/mercuric oxide reference electrode. The present invention has also found that when this discharge capacity is C/20 (mAh) or more, it is possible to obtain an alkaline secondary battery which simultaneously achieves a large capacity, improves the large-current discharge characteristic, and suppresses a decrease in the battery capacity after stand.

Another alkaline secondary battery according to the present invention is an alkaline secondary battery in which an electrode group formed by insulating a positive electrode containing a nickel compound and a cobalt compound from a negative electrode by interposing a separator between them is accommodated in a closed case, and an alkaline electrolyte is also contained in the closed case, wherein assuming that the cobalt compound contained in the positive electrode is cobalt oxyhydroxide, when discharge is performed at 45° C. by causing a short using a 2-Ω resistance, the battery has a quantity of electricity which flows while the voltage decreases from 100 mY to 20 mV and which is 20% or more of an electrochemical capacity of the cobalt oxyhydroxide calculated on the basis of its electrochemical equivalent.

If the voltage at which the measurement of the passing electricity quantity is started is higher than 100 mV determination of the measurement start point is difficult. Because the battery voltage rapidly drops to nearly 100 mV after discharge of the nickel active material is completed when the 2-Ω resistance is connected to the battery. If the measurement start voltage is lower than 100 mV, the passing electricity quantity to be measured decreases. Consequently, it becomes difficult to accurately measure the passing electricity quantity.

If the voltage at which the measurement of the passing electricity quantity is completed is higher than 20 mV, the passing electricity quantity to be measured decreases. As a consequence, the passing electricity quantity becomes difficult to accurately measure. If the measurement is done at a voltage lower than 20 mV, the result is a small difference between a battery in which the three objectives described previously are simultaneously achieved, i.e., a large capacity is obtained, the large-current discharge characteristic is improved, and a decrease in the capacity after stand is suppressed, and a battery in which these objectives are left unachieved. Consequently, the determination becomes difficult to make, and the measurement accuracy suffers under the influence of noise.

Assuming that the cobalt compound contained in the positive electrode is cobalt oxyhydroxide, in a secondary battery in which the passing electricity quantity while the battery voltage decreases from 100 mV to 20 mV is smaller than 20% of the electrochemical capacity of the cobalt oxyhydroxide calculated from its electrochemical equivalent, the three objectives described previously are not simultaneously achieved, i.e., it is not possible to simultaneously obtain a large capacity, improve the large-current discharge characteristic, and suppress a decrease in the capacity after stand. A more preferable secondary battery has a passing electricity quantity of 30% or more of the electrochemical capacity. This secondary battery can greatly improve the capacity, the large-current discharge characteristic, and the capacity recovery ratio after stand. The greater the passing electricity quantity, the better. The most preferable secondary battery is one which has a maximum passing electricity quantity of 100% of the electrochemical capacity.

If the resistance for the measurement is too low, discharge is performed with too large a current, and this may cause the battery to generate heat. If the resistance is too high, a long measurement time is required because the battery voltage decreases. Consequently, self-discharge of the battery produces an adverse effect on the measurement.

If the measurement atmosphere temperature is too low, the activity of the cobalt compound in the positive electrode of the battery diminishes, and this makes an effective evaluation of the passing electricity quantity difficult. If the temperature is too high, self-discharge of the battery proceeds and produces an adverse effect on the measurement.

Since these conditions are arbitrary to some extent, the measurement also can be performed under some other conditions. However, if the measurement conditions are altered, it is essential to check the determination criteria.

This alkaline secondary battery according to the present invention is manufactured as follows. That is, an electrode group is formed by insulating a positive electrode containing a nickel compound and a cobalt compound from a negative electrode by interposing a separator between them and accommodated in a closed case. Examples of the cobalt compound are cobalt monoxide, cobalt hydroxide, and metal cobalt. An alkaline electrolyte is contained in the closed case to assemble a secondary battery. After the battery is left to stand for a time by which the electrolyte sufficiently penetrates into the electrode group, initial charge is performed in accordance with one of the methods 1) to 4) described earlier. By this initial charge, the cobalt compound contained in the positive electrode is turned into a cobalt compound containing cobalt oxyhydroxide.

The positive electrode, negative electrode, separator, and alkaline electrolyte used are analogous to those explained in the alkaline secondary battery manufacturing methods described previously.

In this alkaline secondary battery according to the present invention, assuming the cobalt compound in the positive electrode is cobalt oxyhydroxide, the quantity of electricity flowing while the voltage decreases from 100 mV to 20 mV is 20% or more of the electrochemical capacity of the cobalt hydroxide when discharge is performed at a specific temperature by causing a short using a particular resistance. Consequently, it is possible to simultaneously achieve the three objectives described previously, i.e., obtain a large capacity, improve the large-current discharge characteristic, and suppress a decrease in the capacity after stand. The mechanism by which these objectives can be achieved is unclear. As described previously, however, in a paste type positive electrode, nickel hydroxide particles having an insulation performance are electrically connected by cobalt oxyhydroxide as a cobalt compound having an electron conductivity. This improves the utilization of the nickel hydroxide active material. Additionally, the cobalt oxyhydroxide has a very high reaction resistance to reduction. Accordingly, the following consideration is possible from the combination of these characteristics.

That is, the quantity of electricity observed in a region in which the battery voltage decreases from 100 mV to 20 mV corresponds to the amount of cobalt oxyhydroxide contained in the positive electrode, which contributes to electrical conduction between the nickel hydroxide active materials.

Accordingly, the present invention is based on the finding that the amount of nickel hydroxide that electrically connects with a conductor such as a collector by cobalt oxyhydroxide can be defined by the quantity of electricity passing while the battery voltage decreases from 100 mV to 20 mV at 45° C. when a short is caused by 2Ω. The present invention is also based on the finding that only when this electricity quantity is 20% or more, it is possible to obtain an alkaline secondary battery which simultaneously achieves a large capacity, improves the large-current discharge characteristic, and suppresses a decrease in the capacity after stand.

Still another alkaline secondary battery according to the present invention is an alkaline secondary battery in which an electrode group formed by insulating a positive electrode containing a nickel compound and a cobalt compound from a negative electrode by interposing a separator between them is accommodated in a closed case, and an alkaline electrolyte is also contained in the closed case, wherein the battery has a recovery voltage which rises from 10 mV to 30 mV within one hour or less after the battery has been discharged at 45° C. by causing a short using a 2-$\Omega$ resistance for 48 hours and rendered not short-circuited at 25° C.

If the voltage at which the measurement of the time of the change in the battery voltage is started is lower than 10 mV, the measurement accuracy deteriorates under the influence of noise. If the measurement start voltage is higher than 10 mV, the result is a decreased difference between a battery in which the three objectives described previously are simultaneously achieved, i.e., a large capacity is obtained, the large-current discharge characteristic is improved, and a decrease in the capacity after stand is suppressed, and a battery in which these objectives are left unachieved. Consequently, the determination becomes difficult to make.

If the measurement cut off voltage is lower than 30 mV, the result is a decreased difference between a battery in which the three objectives described previously are simultaneously achieved, i.e., a large capacity is obtained, the large-current discharge characteristic is improved, and a decrease in the capacity after stand is suppressed, and a battery in which these objectives are left unachieved. Consequently, the determination becomes difficult to make. If the measurement cut off voltage is higher than 30 mV, the rate of change of the voltage with time decreases. As a consequence, a slight voltage difference results in a large time difference, and this makes an accurate measurement difficult.

If the shorting resistance is too low, discharge is caused by an excessive current, and this may cause the battery to generate heat. If the resistance is too high, a long time is required before the battery voltage lowers to an extent necessary for the measurement. The result is that self-discharge of the battery produces an adverse effect on the measurement.

If the measurement atmosphere temperature is too low, the activity of cobalt oxyhydroxide in the battery lessens, and as a result a long time is required to decrease the battery voltage to an extent necessary for the measurement. If the temperature is too high, self-discharge of the battery proceeds and produces an adverse effect on the measurement.

If the time during which the battery is discharged is shorter than 48 hours, the battery voltage does not completely decrease to an extent necessary for the measurement. This makes the measurement very difficult in many instances. If the time is too long, the battery voltage takes a very long time to recover and in some cases does not reach 30 mV.

Since these conditions are arbitrary to some extent, the measurement also can be performed under some other conditions. However, if the measurement conditions are altered, it is essential to check the determination criteria.

This alkaline secondary battery according to the present invention is manufactured as follows. That is, an electrode group is formed by insulating a positive electrode containing a nickel compound and a cobalt compound from a negative electrode by interposing a separator between them and accommodated in a closed case. Examples of the cobalt compound are cobalt monoxide, cobalt hydroxide, and metal cobalt. An alkaline electrolyte is contained in the closed case to assemble a secondary battery. After the battery is left to stand for a time by which the electrolyte sufficiently penetrates into the electrode group, initial charge is performed in accordance with one of the methods 1) to 4) described earlier. By this initial charge, the cobalt compound contained in the positive electrode is turned into a cobalt compound containing cobalt oxyhydroxide.

The positive electrode, negative electrode, separator, and alkaline electrolyte used are analogous to those explained in the alkaline secondary battery manufacturing methods described previously.

In this alkaline secondary battery according to the present invention, when discharge is performed at a specific temperature for a specific time by causing a short using a particular resistance and then the resistance is released at a predetermined temperature, the voltage rises from 10 mV to 30 mV within one hour. Consequently, it is possible to simultaneously achieve the three objectives described previously, i.e., obtain a large capacity, improve the large-current discharge characteristic, and suppress a decrease in the capacity after stand. The mechanism by which these objectives can be achieved is unclear. As described previously, however, in a paste type positive electrode, nickel hydroxide particles having an insulation performance are electrically connected by cobalt oxyhydroxide as a cobalt compound having an electron conductivity. This improves the utilization of the nickel hydroxide active material. Additionally, the cobalt oxyhydroxide has a very high reaction resistance to reduction. Accordingly, the following consideration is possible from the combination of these characteristics.

That is, the time required by the battery voltage to recover from 10 mV to 30 mV corresponds to the amount of cobalt oxyhydroxide contained in the positive electrode, which contributes to electrical conduction between the nickel hydroxide active materials. More specifically, it is considered that when cobalt oxyhydroxide is stable and difficult to reduce, i.e., is capable of maintaining stable conduction, the battery voltage rapidly recovers from 10 mV to 30 mV even if the battery is discharged at 45° C. in the 2-$\Omega$ shorted state for 48 hours, because the residual amount of cobalt oxyhydroxide is large after this discharge.

The present invention, therefore, is established based on the finding that the amount of nickel hydroxide that electrically connects with a conductor such as a collector by cobalt oxyhydroxide can be defined by the recovery time within which the battery voltage recovers from 10 mV to 30 mV when the battery is shorted with a 2-$\Omega$ resistance at 45° C. for 48 hours and then the resistance is released at room temperature. The present invention is also based on the finding that it is not possible to obtain an alkaline secondary battery which simultaneously achieves a large capacity, improves the large-current discharge characteristic, and suppresses a decrease in the capacity after stand, unless the recovery time is one hour or less. If the recovery time is 45 minutes or less, it is possible to obtain an alkaline secondary battery which is greatly improved in the capacity, the large-current discharge characteristic, and the capacity recovery ratio after stand.

Still another method of manufacturing an initially charged alkaline secondary battery according to the present invention comprises the steps of forming an electrode group by insulating a positive electrode containing a nickel compound and a cobalt compound from a negative electrode by interposing a separator therebetween, preparing an alkaline secondary battery comprising the electrode group and an alkaline electrolyte, performing initial charging of the battery at a high temperature of 40° to 120° C., and performing heat exchange between the initially charged battery and a battery to be initially charged, thereby cooling the initially charged battery and heating the battery to be initially charged.

The positive electrode, negative electrode, separator, and alkaline electrolyte used are analogous to those explained in the alkaline secondary battery manufacturing methods described previously.

The initial charge temperature is defined as above for the reasons explained below. If the initial charge temperature is lower than 40° C., it becomes difficult to improve the utilization of the nickel compound as the active material of the positive electrode. That is, it becomes difficult to obtain a satisfactory battery capacity recovery effect after the battery is left unused for long periods of time. On the other hand, if the initial charge temperature is higher than 120° C., the vapor pressure of the electrolyte rises, and this may activate the safety valve or thermally deteriorate the components of the battery, leading to a significantly decreased reliability. The initial charge temperature is more preferably 40° to 90° C.

As the method of heat exchange between the initially charged battery and a battery to be initially charged, it is possible to use a method of bringing these batteries into direct contact with each other or a method by which these batteries are brought into contact with each other via a heating medium such as water or oil.

In the present invention, an electrode group is formed by insulating a positive electrode containing a nickel compound and a cobalt compound from a negative electrode by interposing a separator between them, a closed case containing the electrode group and the alkaline electrolyte is formed, and initial charge is performed at a predetermined high temperature. In this way the present invention can manufacture an initially charged alkaline secondary battery which has a large capacity and an improved large-current discharge characteristic and in which a decrease in the capacity after long-term storage can be suppressed.

In addition, heat exchange is performed between the initially charged battery and a battery not initially charged yet, thereby cooling the initially charged battery and heating the battery before initial charge. Consequently, it is possible to suppress an excess rise of the manufacture atmosphere temperature caused by heat generated from the initially charged battery. Furthermore, the initial charge can be efficiently performed because the heating time of the battery not initially charged can be shortened. Moreover, the manufacturing cost can be reduced by energy saving.

That is, a temperature of 60° to 80° C. as an effective temperature range for producing cobalt oxyhydroxide which acts as a conductive matrix in the positive electrode in the initial charge step is higher by 30° to 40° C. or more than room temperature. Meanwhile, a calory of approximately 18 cal is necessary to raise the temperature by 1° C. in an AA-size nickel-hydrogen secondary battery. Accordingly, if the temperature of the secondary battery before initial charge is 25° C. and the initial charge temperature is 70° C., it is necessary to raise the temperature by 45° C. Consequently, a calory of 810 cal is required for one AA-size secondary battery. To heat 10,000 secondary batteries, for example, a large calory of approximately $10^7$ cal is necessary. On the contrary, to cool these initially charged secondary batteries to a temperature of 20° to 30° C., the same calory must be released from the batteries.

As described above, if heating and cooling are performed whenever each of a plurality of secondary batteries is initially charged, corresponding extra energy is necessary, and this results in a low efficiency. In the present invention, therefore, heat exchange is performed between a secondary battery or secondary batteries subjected to initial charge and still at high temperatures and a secondary battery or secondary batteries each not subjected to the initial charge. Consequently, it is possible to eliminate the consumption of extra energy and avoid an unnecessary rise of the manufacture atmosphere temperature.

Note that if the initial charge temperature is raised in the alkaline secondary battery manufacturing method comprising the initial charge step which comprises a charging process of satisfying Inequality (1) above; 50<(T×C2)/(I×S)<2000, it is also possible to perform heat exchange between the initially charged secondary battery and a closed case containing a electrode group and an alkaline electrolyte and not initially charged yet.

The present invention will be described in more detail below by way of its preferred examples.

EXAMPLES 1–14 & COMPARATIVE EXAMPLES 1–6

Materials listed in Table 1 below were weighed and well mixed. Water was added to the resultant mixtures, and the mixtures were further kneaded to prepare pastes 1 to 4 of nickel active materials.

TABLE 1

|  | Paste 1 (g) | Paste 2 (g) | Paste 3 (g) | Paste 4 (g) | Paste 5 (g) |
|---|---|---|---|---|---|
| Nickel hydroxide | 100 | 100 | 100 | 100 | 100 |
| Cobalt monoxide | 10 | 5 | — | — | — |
| Cobalt hydroxide | — | — | 10 | — | 5 |
| Metal cobalt | — | — | — | 10 | 7 |
| CMC* | 0.15 | 0.15 | 0.15 | 0.15 | 0.15 |
| Sodium polyacrylate | 0.175 | 0.175 | 0.175 | 0.175 | 0.175 |
| PTFE** | 3.5 | 3.5 | 3.5 | 3.5 | 3.5 |

*: Carboxymethylcellulose
**: Polytetrafluoroethylene

Each of the pastes shown in Table 1 was applied on and filled in a nickel foamed substrate (CELMET (tradename); available from Sumitomo Electric Industries, Ltd.) having a three-dimensional structure, and dried by leaving the substrate to stand in a hot-air dryer. After being sufficiently dried, each resultant substrate was pressed until a predetermined thickness was obtained by using a two-stage rolling mill and finally punched into dimensions of 40 mm×65 mm by using a punching press, thereby manufacturing a paste type positive electrode. In the manufacture of these positive electrodes, the application, filling, and pressing of the pastes were so adjusted that the theoretical capacity calculated on the basis of the nickel hydroxide content obtained from the final weight was approximately 1050 mAh.

1 g of KETJEN BLACK and, as a binder, 0.1 g of carboxymethylcellulose (CMC), 0.3 g of sodium polyacrylate, and 2 g of polytetrafluoroethylene (PTFE) were added to 100 g of $LmNi_{4.0}Co_{0.4}Mn_{0.3}Al_{0.3}$ (Lm; lanthanum-rich misch metal consisting of 53 wt % of La, 34 wt % of Nd, 8 wt % of Pr, 4 wt % of Ce, and 1 wt % of impurity) and well mixed. Water was added to the resultant mixture to prepare a paste of a hydrogen-absorbing alloy. The paste was applied on the two surfaces of a punched metal and dried by leaving the punched metal in a hot-air dryer. After being sufficiently dried, the resultant metal was pressed until a predetermined thickness was obtained by using a two-stage rolling mill and finally punched into dimensions of 40 mm×105 mm by using a punching press, thereby manufacturing a hydrogen-absorbing alloy negative electrode. In the manufacture of this negative electrode, the application, filling, and pressing of the paste were so adjusted that the theoretical capacity calculated on the basis of the hydrogen-absorbing alloy content obtained from the final weight was approximately 2000 mAh.

These electrodes were wound while being insulated by a separator made from polypropylene nonwoven fabric to thereby manufacture electrode group. These electrode group were inserted into AA-size battery cases, and an electrolyte prepared by mixing 7.5N potassium hydroxide and 0.5N lithium hydroxide was injected into these cases. Each resultant case was sealed by a sealing plate with a safety valve whose operating pressure was 15 kgf/cm$^2$. In this manner AA-size nickel-hydrogen secondary batteries having the structure shown in FIG. 1 described above were assembled.

Independently of these secondary batteries, nickel active material paste 1 having the composition shown in Table 1 was applied on and filled in a nickel foamed substrate and the substrate was pressed following the same procedures as described above. The pressed substrate was finally punched into dimensions of 35 mm×120 mm by using a punching press, manufacturing a positive electrode. In the manufacture of this positive electrode, the application, filling, and pressing of the paste was so adjusted that the theoretical capacity calculated on the basis of the nickel hydroxide content obtained from the final weight was approximately 1600 mAh. Following the same procedures as described above, an electrode group was manufactured using this positive electrode and a hydrogen-absorbing alloy negative electrode (but having dimensions of 35 mm×160 mm) formed following exactly the same procedures as above. This electrode group was used to assemble a 4/5A-size nickel-hydrogen secondary battery.

In addition, nickel active material paste 5 having the composition shown in Table 1 was applied on and filled in a nickel foamed substrate and the substrate was pressed following the same procedures as described above. The pressed substrate was finally punched into dimensions of 40 mm×65 mm by using a punching press, manufacturing a positive electrode. In the manufacture of this positive electrode, the application, filling, and pressing of the paste was so adjusted that the theoretical capacity calculated on the basis of the nickel hydroxide content obtained from the final weight was approximately 1050 mAh. Following the same procedures as described above, an electrode group was manufactured using this positive electrode and a hydrogen-absorbing alloy negative electrode formed following exactly the same procedures as above (but having dimensions of 40 mm×105 mm). This electrode group was used to assemble a AA-size nickel-hydrogen secondary battery.

After lead wires were connected to the secondary batteries thus obtained, these secondary batteries were set in constant temperature baths at room temperature (25° C.), 40° C., 60° C., 80° C., 120° C., and 140° C. Under the conditions listed in Table 2 below, a quantity of electricity 1.5 times the theoretical capacity of each positive electrode was charged, i.e., initial charge was performed.

TABLE 2

| | Paste No. | Electrode size | Cobalt compound electrochemical capacity C (mAh) | Electrode areas S (cm$^2$) | Charging temperature T (°C.) | Charging current I (mA) | (T × C$^2$)/(I × S) |
|---|---|---|---|---|---|---|---|
| Example 1 | 1 | AA | 130 | 26 | 80 | 30 | 1733 |
| Example 2 | 1 | AA | 130 | 26 | 80 | 80 | 650 |
| Example 3 | 1 | AA | 130 | 26 | 80 | 200 | 260 |
| Example 4 | 1 | AA | 130 | 26 | 80 | 1000 | 52 |
| Comparative Example 1 | 1 | AA | 130 | 26 | 80 | 10 | 5200 |
| Comparative Example 2 | 1 | AA | 130 | 26 | 80 | 2000 | 26 |
| Example 5 | 2 | AA | 65 | 26 | 80 | 20 | 650 |
| Example 6 | 3 | AA | 105 | 26 | 80 | 50 | 678 |
| Example 7 | 4 | AA | 496 | 26 | 80 | 1050 | 721 |
| Example 8 | 1 | 4/5A | 198 | 42 | 80 | 110 | 679 |
| Comparative Example 3 | 2 | AA | 65 | 26 | 80 | 500 | 26 |
| Comparative Example 4 | 3 | AA | 105 | 26 | 80 | 1300 | 26 |
| Comparative Example 5 | 1 | 4/5A | 198 | 42 | 80 | 3000 | 25 |
| Example 9 | 1 | AA | 130 | 26 | 25 | 25 | 650 |
| Example 10 | 1 | AA | 130 | 26 | 40 | 40 | 650 |
| Example 11 | 1 | AA | 130 | 26 | 60 | 60 | 650 |
| Example 12 | 1 | AA | 130 | 26 | 80 | 80 | 650 |
| Example 13 | 1 | AA | 130 | 26 | 120 | 120 | 650 |
| Example 14 | 1 | AA | 130 | 26 | 140 | 140 | 650 |
| Comparative Example 6 | 5 | AA | 400 | 26 | 60 | 105 | 3516 |

Each initially charged secondary battery was discharged by 1 C until the battery voltage decreased to 0.8 V, subsequently charged by 0.3 C for five hours, and then discharged by 1 C until the battery voltage decreased to 0.8 V. This operation cycle was repeated ten times, and the battery capacity was checked. The utilization of the nickel electrode was calculated by dividing the battery capacity by the theoretical capacity of the nickel electrode. Note that 1 C indicates a current value by which the capacity of a battery can be completely discharged within one hour. After the utilization was calculated, each secondary battery was charged by 0.3 C for five hours, and the capacity was measured when the battery was discharged with 3 C until the voltage decreased to 0.8 V. The ratio of the measured capacity to the capacity at 1 C was calculated as the large-current discharge characteristic of the battery. Also, to acceleratedly evaluate the state of each secondary battery if the battery was left unused for long time periods in a battery-driven apparatus, the two terminals of the battery were shorted by a 2-Ω resistance, and the battery was left to stand in a constant temperature bath at 45° C. for one week. Thereafter, the battery was charged by 0.3 C for five hours and discharged by 1 C, and the capacity of the battery was evaluated. The ratio of the measured capacity to the capacity before the battery was left to stand was calculated as the recovery characteristic after storage. These results are summarized in Table 3 below.

TABLE 3

|  | Utilization (%) | Large-current discharge characteristic (%) | Recovery ratio after storage (%) |
| --- | --- | --- | --- |
| Example 1 | 110 | 87 | 92 |
| Example 2 | 108 | 90 | 95 |
| Example 3 | 105 | 89 | 96 |
| Example 4 | 100 | 85 | 90 |
| Comparative Example 1 | 90 | 89 | 95 |
| Comparative Example 2 | 83 | 74 | 81 |
| Example 5 | 100 | 88 | 91 |
| Example 6 | 107 | 93 | 92 |
| Example 7 | 103 | 90 | 97 |
| Example 8 | 110 | 92 | 95 |
| Comparative Example 3 | 89 | 74 | 82 |
| Comparative Example 4 | 92 | 80 | 86 |
| Comparative Example 5 | 86 | 72 | 83 |
| Example 9 | 110 | 87 | 92 |
| Example 10 | 109 | 90 | 96 |
| Example 11 | 107 | 93 | 95 |
| Example 12 | 109 | 89 | 97 |
| Example 13 | 105 | 88 | 91 |
| Example 14 | 97 | 87 | 87 |
| Comparative Example 6 | 91 | 84 | 91 |

As is apparent from Table 3 above, the secondary batteries in Examples 1 to 14 meeting Inequality (1); $50 < (T \times C^2)/(I \times S) < 2000$ described earlier simultaneously satisfy the battery characteristic requirement standards, i.e., utilization>95%, large-current discharge characteristic>85%, and recovery characteristic after storage>85%. Additionally, as can be seen by comparing Examples 1 to 4 with Comparative Examples 1 and 2, the requirement conditions as a secondary battery cannot be met if the initial charge current value falls outside the range of Inequality (1), regardless of whether the value is too large or too small. Comparison of Examples 5 to 7 with Comparative Examples 3 and 4 shows that the above effect is achieved by taking account of the electrochemical capacity of the cobalt compound and does not largely depend upon the type of cobalt compound. Also, comparison of Example 8 with Comparative Example 5 reveals that the effect can be achieved even for different electrode sizes if Inequality (1) is satisfied by taking the electrode area into account. This demonstrates that Inequality (1) is universally effective.

It is evident from comparison of Examples 9 to 14 that excellent characteristics as a secondary battery can be obtained even at different initial charge temperatures as long as Inequality (1) is met. However, Table 3 also shows that a temperature of preferably 40° C. to 120° C., and more preferably 40° C. to 90° C. is suitable when the balance of the battery characteristics is taken into consideration. Especially in Example 14 in which the atmosphere temperature was 140° C. which was slightly severe for the battery constituent materials, the safety valve operating pressure of some tested batteries changed, and the separators of some tested batteries partially dissolved. Furthermore, Comparative Example 6 shows that the requirement conditions as a secondary battery can no longer be met if the battery is charged by 0.1 C at 60° C. as used in the conventional manufacturing methods.

EXAMPLES 15–21

Initial charge were conducted in two steps i.e., charge in the early stages was done under the same conditions as in Example 2 listed in Table 2 above and subsequently the temperature of the battery was lowered to 25° C. The total electricity quantity was set to 1.5 times the nickel theoretical capacity as in Examples 1 to 14. The utilization, large-current discharge characteristic, and recovery characteristic after storage of each nickel-hydrogen secondary battery thus initially charged were checked. The results are also shown in Table 4.

TABLE 4

|  | Cobalt compound electrochemical capacity C (mAh) | 80° C. charged quantity $Q_{80}$ (mAh) | Room temperature charged quantity $Q_{25}$ (mAh) | Utilization (%) | Large-current discharge characteristic (%) | Recovery characteristic after storage (%) | $Q_{80}/C$ |
| --- | --- | --- | --- | --- | --- | --- | --- |
| Example 15 | 130 | 5 | 1570 | 100 | 87 | 91 | 0.04 |
| Example 16 | 130 | 13 | 1562 | 105 | 92 | 97 | 0.10 |
| Example 17 | 130 | 130 | 1445 | 112 | 97 | 99 | 1.00 |
| Example 18 | 130 | 260 | 1315 | 110 | 95 | 100 | 2.00 |
| Example 19 | 130 | 390 | 1185 | 109 | 93 | 98 | 3.00 |
| Example 20 | 130 | 520 | 1055 | 107 | 90 | 96 | 4.00 |
| Example 21 | 130 | 1575 | 0 | 108 | 90 | 95 | 12.12 |

As can be seen from Table 4 above, particularly the secondary batteries in Examples 16 to 19 in which the initial charge was done such that $Q_{80}/C$ was 0.1 to 3 were superior in the various characteristics. This indicates that if the initial charge heating is done within a range centering around the electricity quantity required to oxidize the cobalt compound contained in the positive electrode, a nickel-hydrogen secondary battery meeting the various characteristics can be obtained without unnecessarily deteriorating the positive electrode or the hydrogen-absorbing alloy negative electrode.

EXAMPLES 22–26

EXAMPLE 22

Manufacture of paste type negative electrode

First, 0.125 parts by weight of sodium polyacrylate, 0.125 parts by weight of carboxymethylcellulose, 0.25 parts by weight of polytetrafluoroethylene, 1 part by weight of carbon black, and 60 parts by weight of water were added and mixed to 100 parts by weight of a hydrogen-absorbing alloy powder of $LmNi_{4.2}Co_{0.2}Mn_{0.3}Al_{0.3}$ (Lm; lanthanum-rich misch metal having the composition described previously). The resultant mixture was kneaded while being applied with a shearing stress, thereby preparing a paste. The paste was applied on a punched metal and dried, and the resultant was pressed and finally punched into dimensions of 55 mm×160 mm by using a punching press, thereby manufacturing a negative electrode. In the manufacture of this negative electrode, the application, filling, and pressing of the paste were so adjusted that the theoretical capacity calculated on the basis of the hydrogen-absorbing alloy content obtained from the final weight was approximately 3500 mAh.

Manufacture of paste type nickel positive electrode

A paste was prepared by kneading 90 parts by weight of a nickel hydroxide powder, 10 parts by weight of cobalt monoxide, 0.25 parts by weight of sodium polyacrylate, 0.25 parts by weight of carboxymethylcellulose, 3.0 parts by weight of polytetrafluoroethylene, and 30 parts by weight of water. This paste was applied on and filled in a conductive substrate made of nickel fibers and dried. The resultant was pressed and finally punched into dimensions of 55 mm×120 mm by using a punching press, thereby manufacturing a positive electrode. In the manufacture of this positive electrode, the application, filling, and pressing of the paste were so adjusted that the theoretical capacity calculated on the basis of the nickel hydroxide content obtained from the final weight was approximately 2400 mAh.

A separator made of polypropylene nonwoven fabric which was given hydrophilic nature was arranged between the positive and negative electrodes thus obtained. The resultant electrode group was placed in metal case, and an electrolyte primarily consisting of potassium hydroxide was contained in this case. By further using members such as metal covers, 4/3A-size cylindrical nickel-hydrogen secondary batteries (theoretical capacity; 2.4 Ah) having the structure shown in FIG. 1 were assembled.

EXAMPLE 23

4/3A-size cylindrical nickel-hydrogen secondary batteries (theoretical capacity; 2.4 Ah) having the structure shown in FIG. 1 were assembled following the same procedures as described above except that $LmNi_{4.1}Co_{0.3}Mn_{0.3}Al_{0.3}$ (Lm; lanthanum-rich misch metal having the composition described previously) was used as the hydrogen-absorbing alloy powder of the negative electrode.

EXAMPLE 24

4/3A-size cylindrical nickel-hydrogen secondary batteries (theoretical capacity; 2.4 Ah) having the structure shown in FIG. 1 were assembled following the same procedures as described above except that $LmNi_{4.0}Co_{0.4}Mn_{0.3}Al_{0.3}$ (Lm; lanthanum-rich misch metal having the composition described previously) was used as the hydrogen-absorbing alloy powder of the negative electrode.

EXAMPLE 25

4/3A-size cylindrical nickel-hydrogen secondary batteries (theoretical capacity; 2.4 Ah) having the structure shown in FIG. 1 were assembled following the same procedures as described above except that $LmNi_{3.9}Co_{0.5}Mn_{0.3}Al_{0.3}$ (Lm; lanthanum-rich misch metal having the composition described previously) was used as the hydrogen-absorbing alloy powder of the negative electrode.

EXAMPLE 26

4/3A-size cylindrical nickel-hydrogen secondary batteries (theoretical capacity; 2.4 Ah) having the structure shown in FIG. 1 were assembled following the same procedures as described above except that $LmNi_{3.8}Co_{0.6}Mn_{0.3}Al_{0.3}$ (Lm; lanthanum-rich misch metal having the composition described previously) was used as the hydrogen-absorbing alloy powder of the negative electrode.

Each assembled nickel-hydrogen secondary battery was charged by 0.1 CmA (240 mA) at a temperature of 80° C. with a current which was 150% of the theoretical battery capacity, returned to room temperature, and discharged by 1 CmA. In this way initial charge was performed. The resultant secondary batteries were charged by 0.1 CmA at room temperature for 15 hours and discharged by 1.0 CmA (2400 mA) until the terminal voltage was 1.0 V. Thereafter, the initial capacity of each battery was measured.

Each nickel-hydrogen secondary battery thus initially charged was stored as it was left discharged at a high temperature (65° C.) for one month. Each resultant secondary battery was repeatedly charged and discharged three times under the same conditions as in the initial capacity measurement. The recovery ratio (percentage) of the battery was calculated by dividing the discharge capacity in the third measurement by the initial capacity. These results are summarized in Tables 5 and 6 below.

TABLE 5

| | Hydrogen-absorbing alloy | Battery size | Cobalt compound electrochemical capacity C (mAh) | Electrode area S (cm²) |
|---|---|---|---|---|
| Example 22 | $LmNi_{4.2}Co_{0.2}Mn_{0.3}Al_{0.3}$ | 4/3A | 300 | 66 |
| Example 23 | $LmNi_{4.1}Co_{0.3}Mn_{0.3}Al_{0.3}$ | 4/3A | 300 | 66 |
| Example 24 | $LmNi_{4.0}Co_{0.4}Mn_{0.3}Al_{0.3}$ | 4/3A | 300 | 66 |
| Example 25 | $LmNi_{3.9}Co_{0.5}Mn_{0.3}Al_{0.3}$ | 4/3A | 300 | 66 |
| Example 26 | $LmNi_{3.8}Co_{0.6}Mn_{0.3}Al_{0.3}$ | 4/3A | 300 | 66 |

TABLE 6

|  | Charging temperature T (°C.) | Charging current I (mA) | (T × C²)/ (I × S) | Recovery characteristic after storage (%) |
|---|---|---|---|---|
| Example 22 | 80 | 240 | 455 | 81 |
| Example 23 | 80 | 240 | 455 | 84 |
| Example 24 | 80 | 240 | 455 | 96 |
| Example 25 | 80 | 240 | 455 | 95 |
| Example 26 | 80 | 240 | 455 | 97 |

As is evident from Tables 5 and 6 above, when the initial charge was done under the conditions meeting Inequality (1) described earlier, the secondary batteries in Examples 22 to 26 satisfy high recovery ratio after storage in severe circumstance, i.e., recovery ratio>80%. Particularly, the secondary batteries in Examples 24 to 26 in each of which a negative electrode containing a hydrogen-absorbing alloy powder whose cobalt substitution amount was 0.4 or more was incorporated had higher capacity recovery ratios than those of the secondary batteries in Examples 22 and 23 in which the cobalt substitution amount was smaller than 0.4. That is, Examples 24 to 26 were superior to Examples 22 and 23 in the long-term storage characteristic. The reason for this is considered that the use of the hydrogen-absorbing alloy powder whose cobalt substitution amount was 0.4 or more improved the utilization of the positive electrodes in Examples 24 to 26 compared to those in Examples 22 and 23.

EXAMPLES 27–32 & COMPARATIVE EXAMPLES 7 & 8

10 g of cobalt monoxide and, as a binder, 0.15 g of CMC, 0.175 g of sodium polyacrylate, and 3.5 g of PTFE were added to 100 g of nickel hydroxide and well mixed. Water was added to the resultant mixture to prepare a nickel active material paste. The paste was applied on and filled in a nickel foamed substrate (CELMET (tradename); available from Sumitomo Electric Industries, Ltd.) having a three-dimensional structure, and dried by leaving the substrate in a hot-air dryer. After being sufficiently dried, the resultant substrate was pressed until a predetermined thickness was obtained by using a two-stage rolling mill and finally punched into a square paste type positive electrode of 20 mm side by using a punching press. In the manufacture of this positive electrode, the application, filling, and pressing of the paste were so adjusted that the theoretical capacity calculated on the basis of the nickel hydroxide content obtained from the final weight was approximately 200 mAh.

This positive electrode and a sintered cadmium electrode were assembled into an electrode group by interposing a separator between them by using a press plate. The electrode group and 150 ml of an 8N potassium hydroxide solution were encapsulated into a sealable plastic case (volume 200 ml). In this fashion, eight single-electrode evaluation cells were assembled.

These single-electrode evaluation cells were charged and discharged under the initial charge conditions and the aging charge/discharge conditions shown in Table 7 below. The results are summarized in Table 8 below. Note that C in Table 7 and in the subsequent description indicates a current value by which the theoretical capacity of the positive electrode can be completely charged or discharged within one hour (for example, 1 C is 198 mA in cell 27).

TABLE 7

| Charge/discharge method | |
|---|---|
| Weak current charge | Charge at 25° C. by 0.02 C for 75 h |
| Intermittent charge | Charge at 25° C. by 0.05 C for 1 h and leave the cell to stand for 1 h. Repeat this 30 times |
| High-temperature charge | Charge at 80° C. by 0.1 C for 15 h |
| Normal charge | Charge at 25° C. by 0.5 C for 3 h |
| Aging charge/discharge | Charge at 25° C. by 0.3 C for 5 h and discharge by 1 C until cell voltage was 0.8 V. Repeat this 10 times |

TABLE 8

|  | Theoretical capacity (mAh) | Initial charge method | Initial capacity (utilization) |
|---|---|---|---|
| Example 27 | 198 | Weak current charge | 208 mAh (105%) |
| Example 28 | 201 | " | 208 mAh (103%) |
| Example 29 | 205 | Intermittent charge | 219 mAh (107%) |
| Example 30 | 197 | " | 209 mAh (106%) |
| Example 31 | 200 | High-temperature charge | 208 mAh (104%) |
| Example 32 | 195 | " | 207 mAh (106%) |
| Comparative Example 7 | 207 | Normal charge | 201 mAh (97%) |
| Comparative Example 8 | 201 | " | 191 mAh (95%) |

These single-electrode evaluation cells thus initially charged were discharged by 1 C until the cell voltage decreased to 0.8 V and subjected to aging charge/discharge. The capacity obtained when discharge was finally performed in this aging charge/discharge was evaluated as the initial capacity.

To evaluate the large-current discharge characteristics of these single-electrode evaluation cells, the single-electrode evaluation cells were charged by 0.3 C for five hours and discharged by 3 C until the cell voltage decreased to 0.8 V, and the capacity of each cell was measured. In addition, subsequently to this measurement odd-numbered cells in these examples and comparative examples were shorted with a 1-kΩ resistance, left to stand at room temperature for one month, in order to simulate conditions where these cells were left unused after being incorporated into electronic apparatuses. Subsequently, these batteries were subjected to the aging charge/discharge described above. The capacity obtained when discharge was finally performed in this aging charge/discharge was measured. The measured capacities were compared with the respective initial capacities. The results are shown in Table 9 below.

TABLE 9

|  | Initial capacity | 3 C capacity/ 1 C capacity | Capacity after/storage initial capacity |
|---|---|---|---|
| Example 27 | 208 mAh | 90% | 94% |
| Example 28 | 208 mAh | 88% | — |
| Example 29 | 219 mAh | 89% | 95% |
| Example 30 | 209 mAh | 90% | — |
| Example 31 | 208 mAh | 92% | 100% |
| Example 32 | 207 mAh | 94% | — |
| Comparative Example 7 | 201 mAh | 81% | 81% |
| Comparative Example 8 | 191 mAh | 83% | — |

As can be seen from Table 9 above, the batteries in Examples 27 to 32 were superior to the batteries in Comparative Examples 7 and 8 in all of the utilization, the large-current discharge capacity, and the capacity recovery after long-term storage.

Meanwhile, even-numbered cells in these examples and comparative examples were tested as follows. That is, the cover of each cell was opened, and the cell and a mercury/mercuric oxide reference electrode were dipped into an acrylic resin vessel filled with an electrolyte. Assuming the cobalt compound contained in the nickel electrode was cobalt oxyhydroxide, the cell was discharged with a current value 1/100 the current value by which the electrochemical capacity of cobalt oxyhydroxide can be discharged within one hour. The electrochemical capacity is calculated from the electrochemical equivalent of the cobalt oxyhydroxide. Under this condition, changes in the discharge potential with respect to the mercury/mercuric oxide reference electrode were recorded, and the quantity of electricity discharged while the potential dropped from 200 mV to −200 mV was obtained. The method of obtaining the electrochemical capacity of cobalt oxyhydroxide calculated from its electrochemical equivalent assuming that the cobalt compound is cobalt oxyhydroxide will be described in detail below. In the case of Example 27, for instance, the theoretical capacity is 198 mAh as shown in Table 8 above, and so the amount of nickel hydroxide in this electrode is 198−289=0.685 (g). Since this electrode contains 10 g of cobalt monoxide with respect to 100 g of nickel hydroxide, the amount of cobalt monoxide is 0.0685 g. This corresponds to 0.915 mmole because the molecular weight of cobalt monoxide is 74.9. Assuming that all the compound of this number of moles change into cobalt oxyhydroxide in the initial charge and the cobalt oxyhydroxide is reduced from trivalent to divalent, the electrochemical capacity is $26.806 \times (3-2) \times 0.915 \times 10^{-3}=$ 24.5 mAh. The results are shown in Table 10 below.

TABLE 10

| | Cobalt compound electro-chemical capacity (mAh) | Passing electricity quantity (mAh) when voltage dropped from 200 mV to −200 mV | Ratio (%) to cobalt compound electro-chemical |
|---|---|---|---|
| Example 28 | 24.8 | 1.98 | 8.0 |
| Example 30 | 24.4 | 2.38 | 9.8 |
| Example 32 | 24.1 | 3.88 | 16.1 |
| Comparative Example 8 | 24.9 | 0.79 | 3.2 |

Comparing Table 10 with Tables 8 and 9 clearly shows that when discharge was performed with a current 1/100 the electrochemical capacity of cobalt oxyhydroxide in the positive electrode, the single-electrode evaluation cells in Examples 28, 30, and 32 each of which included a positive electrode whose passing electricity quantity was large while the potential dropped from 200 mV to −200 mV with respect to the mercury/mercuric oxide reference electrode were superior to Comparative Example 8 in all of the utilization, the large-current discharge characteristic, and the long-term storage recovery characteristic.

EXAMPLES 33–38 & COMPARATIVE EXAMPLES 9 & 10

To confirm that the characteristics obtained by the nickel single electrode described above can also be obtained by an actual alkaline secondary battery, nickel-hydrogen secondary batteries were manufactured by the following procedures.

10 g of cobalt monoxide and, as a binder, 0.15 g of CMC, 0.175 g of sodium polyacrylate, and 3.5 g of PTFE were added to 100 g of nickel hydroxide and well mixed. Water was added to the resultant mixture to prepare a nickel active material paste. The paste was applied on and filled in a nickel foamed substrate (CELMET (tradename); available from Sumitomo Electric Industries, Ltd.) having a three-dimensional structure, and dried by leaving the substrate in a hot-air dryer. After being sufficiently dried, the resultant substrate was pressed until a predetermined thickness was obtained by using a two-stage rolling mill and finally punched into dimensions of 40 mm×65 mm, thereby manufacturing a paste type positive electrode. In the manufacture of this positive electrode, the application, filling, and pressing of the paste were so adjusted that the theoretical capacity calculated on the basis of the nickel hydroxide content obtained from the final weight was approximately 1050 mAh.

1 g of KETJEN BLACK and, as a binder, 0.1 g of CMC, 0.3 g of sodium polyacrylate, and 2 g of PTFE were added to 100 g of $LmNi_{4.0}Co_{0.4}Mn_{0.3}Al_{0.3}$ (Lm; lanthanum-rich misch metal having the composition described previously) and well mixed. Water was added to the resultant mixture to prepare a paste of a hydrogen-absorbing alloy. The paste was applied on the two surfaces of a punched metal and dried by leaving the punched metal in a hot-air dryer. After being sufficiently dried, the resultant metal was pressed until a predetermined thickness was obtained by using a two-stage rolling mill and finally punched into dimensions of 40 mm×105 mm by using a punching press, thereby manufacturing a hydrogen-absorbing alloy negative electrode. In the manufacture of this negative electrode, the application, filling, and pressing of the paste were so adjusted that the theoretical capacity calculated on the basis of the hydrogen-absorbing alloy content obtained from the final weight was approximately 2000 mAh.

These electrodes were wound while being insulated by a separator made from polypropylene nonwoven fabric to manufacture electrode group. These electrode group were inserted into AA-size battery cases, and an electrolyte prepared by mixing 7.5N potassium hydroxide and 0.5N lithium hydroxide was injected into these cases. Each resultant case was sealed by a sealing plate with a safety valve whose operating pressure was 15 kgf/cm². In this manner AA-size nickel-hydrogen secondary batteries having the structure shown in FIG. 1 described above were assembled.

After lead wires were connected to the secondary batteries thus obtained, these batteries were initially charged under the conditions shown in Table 11 below in the same manner as in the single electrode evaluation case. These secondary batteries thus initially charged were discharged by 1 C until the battery voltage decreased to 0.8 V and subjected to aging charge/discharge. The capacity obtained when discharge was finally performed in this aging charge/discharge was evaluated as the initial capacity. The obtained initial capacities and utilizations are also shown in Table 11.

TABLE 11

| | Theoretical capacity (mAh) | Initial charge method | Initial capacity (utilization) |
|---|---|---|---|
| Example 33 | 1048 | Weak current charge | 1132 mAh (108%) |
| Example 34 | 1053 | Weak current charge | 1116 mAh (106%) |
| Example 35 | 1043 | Intermittent charge | 1147 mAh (110%) |
| Example 36 | 1047 | Intermittent charge | 1120 mAh (107%) |
| Example 37 | 1061 | High-temperature charge | 1114 mAh (105%) |
| Example 38 | 1061 | High-temperature | 1146 mAh (108%) |

TABLE 11-continued

|  | Theoretical capacity (mAh) | Initial charge method | Initial capacity (utilization) |
|---|---|---|---|
| Comparative Example 9 | 1049 | charge Normal charge | 997 mAh (95%) |
| Comparative Example 10 | 1054 | Normal charge | 1012 mAh (96%) |

To evaluate the large-current discharge characteristics of these secondary batteries, the batteries were charged by 0.3 C for five hours and discharged by 3 C until the cell voltage decreased to 0.8 V, and the capacity of each battery was measured. In addition, subsequently to this measurement odd-numbered secondary batteries in these examples and comparative examples were shorted with a 1-kΩ resistance, left to stand at room temperature for one month, in order to simulate conditions where these secondary batteries were left unused after being incorporated into electronic apparatuses. Subsequently, these batteries were subjected to the aging charge/discharge described above, and the capacity of each cell was measured. Each measured capacity was divided by the corresponding initial capacity to obtain the recovery characteristic after storage. The results are shown in Table 12 below.

TABLE 12

|  | Large-current discharge characteristic | Recovery ratio after storage |
|---|---|---|
| Example 33 | 92% | 92% |
| Example 34 | 89% | — |
| Example 35 | 92% | 93% |
| Example 36 | 90% | — |
| Example 37 | 90% | 100% |
| Example 38 | 92% | — |
| Comparative Example 9 | 80% | 85% |
| Comparative Example 10 | 83% | — |

Meanwhile, even-numbered batteries in these examples and comparative examples were tested as follows. That is, after each battery was discharged to 0.8 V by 1 C, the battery was disassembled to extract the positive electrode, and the electrode and a mercury/mercuric oxide reference electrode were dipped into an acrylic resin vessel filled with an electrolyte. Assuming the cobalt compound contained in the nickel electrode was cobalt oxyhydroxide, the cell was discharged with a current value $1/100$ the current value by which the electrochemical capacity of cobalt oxyhydroxide can be discharged within one hour. The electrochemical capacity is calculated from the electrochemical equivalent of the cobalt oxyhydroxide. Under this condition, changes in the discharge potential with respect to the mercury/mercuric oxide reference electrode were recorded, and the quantity of electricity discharged while the potential dropped from 200 mV to −200 mV was obtained. The results are shown in Table 13 below. Note that the values of the cobalt compound electrochemical capacity shown in Table 13 are different from the values calculated from the theoretical capacities described in Table 11, since removable of the active material of the nickel electrode occurred when the batteries were disassembled.

TABLE 13

|  | Cobalt compound electrochemical capacity (mAh) | Passing electricity quantity (mAh) when voltage dropped from 200 mV to −200 mV | Ratio (%) to cobalt compound electrochemical |
|---|---|---|---|
| Example 34 | 112 | 9.8 | 8.8 |
| Example 36 | 101 | 11.0 | 10.9 |
| Example 38 | 98 | 14.0 | 14.3 |
| Comparative Example 10 | 108 | 3.0 | 2.8 |

Comparing Table 13 with Tables 11 and 12 clearly shows that even in the case of actual alkaline secondary batteries, when the positive electrode was discharged with a current $1/100$ the electrochemical capacity of cobalt oxyhydroxide in the positive electrode, the secondary batteries in Examples 34, 36, and 38 each of which included a positive electrode whose passing electricity quantity was large while the potential dropped from 200 mV to −200 mV with respect to the mercury/mercuric oxide reference electrode, and the secondary batteries in Examples 33, 35, and 37 manufactured by the same manufacturing method, were superior to the secondary battery in Comparative Example 9 in all of the utilization, the large-current discharge characteristic, and the long-term storage recovery characteristic.

As described above, even in actual alkaline secondary batteries it is possible to simultaneously satisfy the essential characteristics of practical batteries, i.e., a high utilization, a good large-current discharge characteristic, and a good recovery characteristic after long-term storage, by the use of a positive electrode whose passing electricity quantity is $1/20$ or more the electrochemical capacity of cobalt oxyhydroxide, assuming the cobalt compound contained in the positive electrode is cobalt oxyhydroxide, while the potential drops from 200 mV to −200 mV with respect to a mercury/mercuric oxide reference electrode when discharge is performed with a current $1/100$ the electrochemical capacity of cobalt oxyhydroxide.

EXAMPLES 39–44 & COMPARATIVE EXAMPLES 11–16

Pastes (paste Nos. are shown in Table 14 below) having the compositions listed in Table 1 presented earlier were applied on and filled in nickel foamed substrates (CELMET (tradename); available from Sumitomo Electric Industries, Ltd.) having a three-dimensional structure, and dried by leaving the substrates in a hot-air dryer. After being sufficiently dried, each resultant substrate was pressed until a predetermined thickness was obtained by using a two-stage rolling mill and finally punched into dimensions of 40 mm×65 mm, thereby manufacturing a paste type positive electrode. In the manufacture of this positive electrode, the application, filling, and pressing of the paste were so adjusted that the theoretical capacity calculated on the basis of the nickel hydroxide content obtained from the final weight was approximately 1050 mAh.

1 g of KETJEN BLACK and, as a binder, 0.1 g of CMC, 0.3 g of sodium polyacrylate, and 2 g of PTFE were added to 100 g of $LmNi_{4.0}Co_{0.4}Mn_{0.3}Al_{0.3}$ (Lm; lanthanum-rich misch metal having the composition described previously) and well mixed. Water was added to the resultant mixture to prepare a paste of a hydrogen-absorbing alloy. The paste was applied on the two surfaces of a punched metal and dried by leaving the punched metal in a hot-air dryer. After being sufficiently dried, the resultant was pressed until a predetermined thickness was obtained by using a two-stage rolling mill and finally punched into dimensions of 40 mm×105 mm by using a punching press, thereby manufacturing a hydrogen-absorbing alloy negative electrode. In the manufacture of this negative electrode, the application, filling, and pressing of the paste were so adjusted that the theoretical capacity calculated on the basis of the hydrogen-absorbing alloy content obtained from the final weight was approximately 2000 mAh.

These electrodes were wound while being insulated by a separator made from polypropylene nonwoven fabric to manufacture electrode group. These electrode group were inserted into AA-size battery cases, and an electrolyte prepared by mixing 7.5N potassium hydroxide and 0.5N lithium hydroxide was injected into these cases. Each resultant case was sealed by a sealing plate with a safety valve whose operating pressure was 15 kgf/cm². In this manner AA-size nickel-hydrogen secondary batteries having the structure shown in FIG. 1 described above were assembled.

After lead wires were connected to the secondary batteries thus obtained, these batteries were initially charged under the conditions shown in Table 14 below. These secondary batteries thus initially charged were discharged by 1 C until the battery voltage decreased to 0.8 V and subjected to aging charge/discharge. The capacity obtained when discharge was finally performed in this aging charge/discharge was evaluated as the initial capacity. The obtained initial capacities and utilizations are also shown in Table 14.

TABLE 15

|  | Large-current discharge characteristic | Recovery ratio after storage |
|---|---|---|
| Example 39 | 91% | 97% |
| Example 40 | 93% | — |
| Comparative Example 11 | 81% | 82% |
| Comparative Example 12 | 80% | — |
| Example 41 | 91% | 99% |
| Example 42 | 92% | — |
| Comparative Example 13 | 82% | 82% |
| Comparative Example 14 | 82% | — |
| Example 43 | 93% | 97% |
| Example 44 | 92% | — |
| Comparative Example 15 | 87% | 84% |
| Comparative Example 16 | 84% | — |

Meanwhile, even-numbered batteries in these examples and comparative examples were tested as follows. That is, after each battery was discharged to 0.8 V by 1 C, the battery was disassembled to extract the positive electrode, and the electrode and a mercury/mercuric oxide reference electrode

TABLE 14

|  | Theoretical capacity (mAh) | Paste No. | Initial charge method | Initial capacity (utilization) |
|---|---|---|---|---|
| Example 39 | 1038 | 2 | High-temperature charge | 1090 mAh (105%) |
| Example 40 | 1041 | 2 | " | 1093 mAh (105%) |
| Comparative Example 11 | 1043 | 2 | Normal charge | 960 mAh (92%) |
| Comparative Example 12 | 1046 | 2 | " | 983 mAh (94%) |
| Example 41 | 1041 | 3 | High-temperature charge | 1114 mAh (107%) |
| Example 42 | 1051 | 3 | " | 1135 mAh (108%) |
| Comparative Example 13 | 1049 | 3 | Normal charge | 997 mAh (95%) |
| Comparative Example 14 | 1045 | 3 | " | 1003 mAh (96%) |
| Example 43 | 1054 | 4 | High-temperature charge | 1128 mAh (107%) |
| Example 44 | 1051 | 4 | " | 1104 mAh (105%) |
| Comparative Example 15 | 1044 | 4 | Normal charge | 971 mAh (93%) |
| Comparative Example 16 | 1047 | 4 | " | 942 mAh (90%) |

To evaluate the large-current discharge characteristics of these secondary batteries, the batteries were charged by 0.3 C for five hours and discharged by 3 C until the battery voltage decreased to 0.8 V, and the capacity of each battery was measured. In addition, subsequently to this measurement odd-numbered secondary batteries in these examples and comparative examples were shorted with a 1-kΩ resistance, left to stand at room temperature for one month, in order to simulate conditions where these secondary batteries were left unused after being incorporated into electronic apparatuses. Subsequently, these batteries were subjected to the aging charge/discharge described above, and the capacity of each cell was measured. Each measured capacity was divided by the corresponding initial capacity to obtain the recovery characteristic after storage. The results are shown in Table 15 below.

were dipped into an acrylic resin vessel filled with an electrolyte. Assuming the cobalt compound contained in the nickel electrode was cobalt oxyhydroxide, the battery was discharged with a current value 1/100 the current value by which the electrochemical capacity of cobalt oxyhydroxide can be discharged within one hour. The electrochemical capacity is calculated from the electrochemical equivalent of the cobalt oxyhydroxide. Under this condition, changes in the discharge potential with respect to the mercury/mercuric oxide reference electrode were recorded, and the quantity of electricity discharged while the potential dropped from 200 mV to −200 mV was obtained. The results are shown in Table 16 below. Note that the values of the electrochemical capacity of the cobalt compound shown in Table 16 are different from the values calculated from the theoretical capacities described in Table 14, since removal of the active material of the nickel electrode occurred when the batteries were disassembled.

TABLE 16

| | Cobalt compound electro-chemical capacity (mAh) | Passing electricity quantity (mAh) when voltage dropped from 200 mV to −200 mV | Ratio (%) to cobalt compound electro-chemical |
|---|---|---|---|
| Example 40 | 52 | 6.81 | 13.1 |
| Comparative Example 12 | 58 | 1.21 | 2.1 |
| Example 42 | 101 | 16.4 | 16.2 |
| Comparative Example 14 | 99 | 1.54 | 1.6 |
| Example 44 | 151 | 31.9 | 21.1 |
| Comparative Example 16 | 158 | 4.6 | 2.9 |

Comparing Table 16 with Tables 14 and 15 clearly shows that even if the cobalt compound is not cobalt monoxide but, e.g., cobalt hydroxide or metal cobalt, or even if the cobalt compound content is not 10%, it is possible to improve in a well-balanced state the various characteristics of a nickel-hydrogen secondary battery, i.e., the utilization, the large-current discharger characteristic, and the long-term storage recovery characteristic by the use of a positive electrode whose passing electricity quantity is large while the potential drops from 200 mV to −200 mV with respect to a mercury/mercuric oxide reference electrode when discharge is performed wit a current 1/100 the electrochemical capacity of cobalt oxyhydroxide assuming the cobalt compound contained in the positive electrode is cobalt oxyhydroxide.

EXAMPLES 45–50 & COMPARATIVE EXAMPLES 17 & 18

10 g of cobalt monoxide and, as a binder, 0.15 g of CMC, 0.175 g of sodium polyacrylate, and 3.5 g of PTFE were added to 100 g of nickel hydroxide and well mixed. Water was added to the resultant mixture to prepare a paste of a nickel active material. The paste was applied on and filled in a nickel foamed substrate (CELMET (tradename); available from Sumitomo Electric Industries, Ltd.) having a three-dimensional structure, and dried by leaving the substrate in a hot-air dryer. After being sufficiently dried, the resultant substrate was pressed until a predetermined thickness was obtained by using a two-stage rolling mill and finally punched into dimensions of 40 mm×65 mm, thereby manufacturing a non-sintered positive electrode. In the manufacture of this positive electrode, the application, filling, and pressing of the paste were so adjusted that a theoretical capacity calculated on the basis of a nickel hydroxide content obtained from a final weight was approximately 1050 mAh.

1 g of KETJEN BLACK and, as a binder, 0.1 g of CMC, 0.3 g of sodium polyacrylate, and 2 g of PTFE were added to 100 g of $LmNi_{4.0}Co_{0.4}Mn_{0.3}Al_{0.3}$ (Lm; lanthanum-rich misch metal having the composition described previously) and well mixed. Water was added to the resultant mixture to prepare a paste of a hydrogen-absorbing alloy. The paste was applied on the two surfaces of a punched metal and dried by leaving the punched metal in a hot-air dryer. After being sufficiently dried, the resultant was pressed until a predetermined thickness was obtained by using a two-stage rolling mill and finally punched into dimensions of 40 mm×105 mm by using a punching press, thereby manufacturing a hydrogen-absorbing alloy negative electrode. In the manufacture of this negative electrode, the application, filling, and pressing of the paste were so adjusted that the theoretical capacity calculated on the basis of the hydrogen-absorbing alloy content obtained from the final weight was approximately 2000 mAh.

These electrodes were wound while being insulated by a separator made from polypropylene nonwoven fabric to manufacture electrode group. These electrode group were inserted into AA-size battery cases, and an electrolyte prepared by mixing 7.5N potassium hydroxide and 0.5N lithium hydroxide was injected into these cases. Each resultant case was sealed by a sealing plate with a safety valve whose operating pressure was 15 kgf/cm². In this manner AA-size nickel-hydrogen secondary batteries having the structure shown in FIG. 1 described above were assembled.

After lead wires were connected to the secondary batteries thus obtained, the batteries were initially charged under the conditions shown in Table 17 below. These secondary batteries thus initially charged were discharged by 1 C until the battery voltage decreased to 0.8 V and subjected to aging charge/discharge. The capacity obtained when discharge was finally performed in this aging charge/discharge was evaluated as the initial capacity. The obtained initial capacities and utilizations are also shown in Table 17.

TABLE 17

| | Theoretical capacity (mAh) | Initial charge method | Initial capacity (utilization) |
|---|---|---|---|
| Example 45 | 1050 | Weak current charge | 1124 mAh (107%) |
| Example 46 | 1043 | Weak current charge | 1102 mAh (107%) |
| Example 47 | 1064 | Intermittent charge | 1149 mAh (108%) |
| Example 48 | 1055 | Intermittent charge | 1161 mAh (110%) |
| Example 49 | 1049 | High-temperature charge | 1133 mAh (108%) |
| Example 50 | 1060 | High-temperature charge | 1155 mAh (109%) |
| Comparative Example 17 | 1062 | Normal charge | 1030 mAh (97%) |
| Comparative Example 18 | 1050 | Normal charge | 998 mAh (95%) |

To evaluate the large-current discharge characteristics of these secondary batteries, the batteries were charged by 0.3 C for five hours and discharged by 3 C until the cell voltage decreased to 0.8 V, and the capacity of each battery was measured. In addition, subsequently to this measurement odd-numbered secondary batteries in these examples and comparative examples were shorted with a 1-kΩ resistance, left to stand at room temperature for one month, in order to imitate conditions where these secondary batteries were left unused after being incorporated into electronic apparatuses. Subsequently, these batteries were subjected to the aging charge/discharge described above, and the capacity of each cell was measured. Each measured capacity was divided by the corresponding initial capacity to obtain the recovery characteristic after storage. The results are shown in Table 18 below.

TABLE 18

| | Large-current discharge characteristic | Recovery ratio after storage |
|---|---|---|
| Example 45 | 90% | 94% |
| Example 46 | 88% | — |
| Example 47 | 89% | 95% |
| Example 48 | 90% | — |
| Example 49 | 92% | 100% |
| Example 50 | 94% | — |

TABLE 18-continued

|  | Large-current discharge characteristic | Recovery ratio after storage |
|---|---|---|
| Comparative Example 17 | 81% | 81% |
| Comparative Example 18 | 83% | — |

Meanwhile, even-numbered batteries in these examples and comparative examples were tested as follows. That is, after being discharged to 0.8 V by 1 C, each battery was placed in a constant temperature bath at 45° C. When the battery temperature reached 45° C., the battery was shorted with a 2-Ω resistance while the battery voltage was recorded. The voltage recording was stopped when the battery voltage decreased to a few mV, and the battery was left to stand in the constant temperature bath for two days. Thereafter, the battery was taken out from the constant temperature bath while being kept shorted with the 2-Ω resistance. When the battery was well cooled, the 2-Ω resistance was disconnected while the battery voltage was measured.

Figure 2:
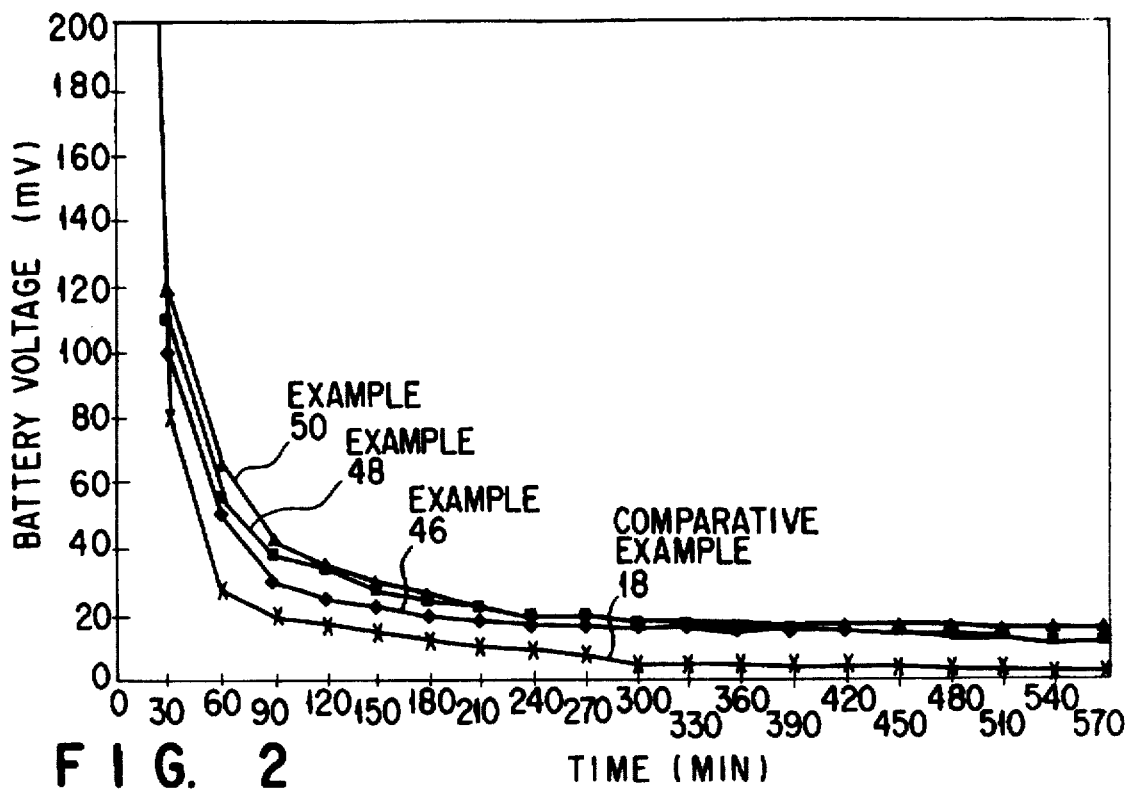
FIG. 2 is a graph showing changes in the voltage of secondary batteries in Examples 46, 48, and 50 of the present invention and Comparative Example 18 when the voltage drops.

FIG. 2 shows changes in the recorded voltage drops with time. From FIG. 2, the quantity of electricity flowing through the resistance while the battery voltage dropped from 100 mV to 20 mV was calculated. And, the ratio of the quantity of electricity to the electrochemical capacity of cobalt oxyhydroxide was calculated. The electrochemical capacity was calculated on the basis of the electrochemical equivalent of the cobalt oxyhydroxide, assuming the cobalt compound in the positive electrode of each battery was cobalt oxyhydroxide. The results are shown in Table 19 below.

Figure 3:
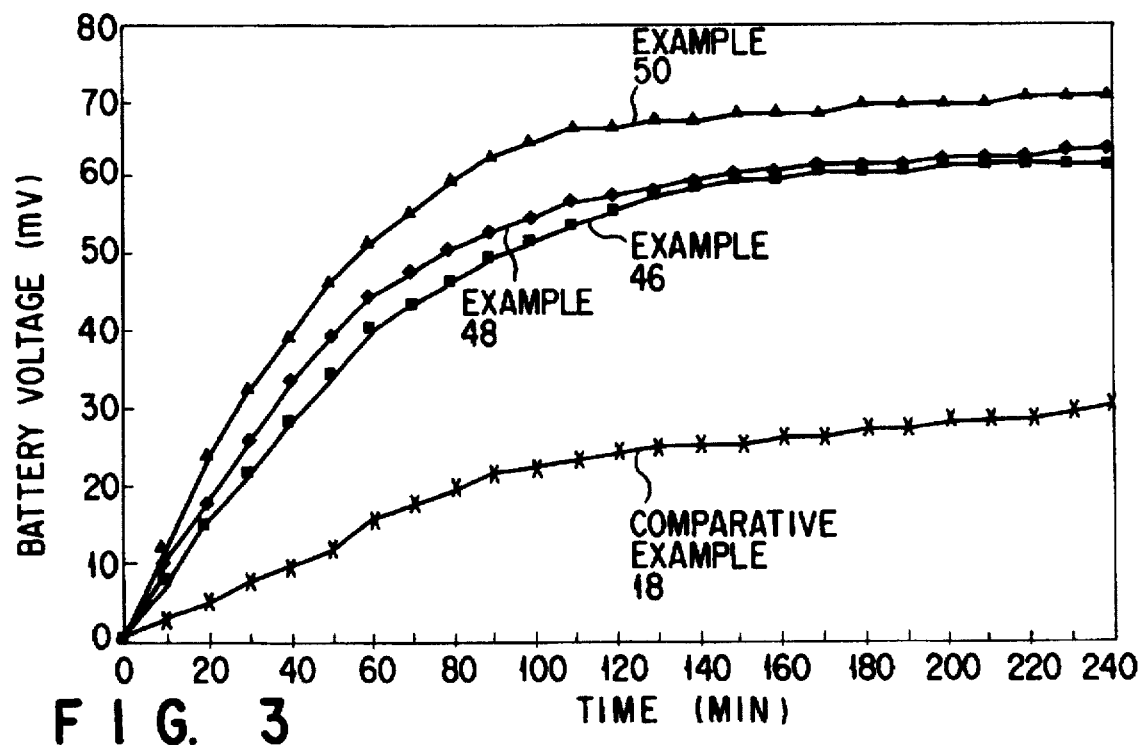
FIG. 3 is a graph showing changes in the voltage of the secondary batteries in Examples 46, 48, and 50 of the present invention and Comparative Example 18 when the voltage recovers.

FIG. 3 shows the voltage recovery when each battery was taken out from the constant temperature bath. From FIG. 3, a time required for the battery voltage to change from 10 mV to 30 mV was obtained. The results are shown in Table 19 below.

TABLE 19

|  | Cobalt compound electrochemical capacity (mAh) | Passing electricity quantity (mAh) during voltage drop (ratio to cobalt compound electrochemical capacity) | Voltage recovery time |
|---|---|---|---|
| Example 46 | 129.2 | 45 (34.8%) | 0 h 25 min |
| Example 48 | 130.6 | 51 (39.0%) | 0 h 32 min |
| Example 50 | 131.3 | 55 (41.9%) | 0 h 18 min |
| Comparative Example 18 | 130.0 | 18 (13.8%) | 3 h 15 min |

As can be seen from Tables 17 to 19 and FIGS. 2 and 3, the secondary batteries in Examples 45 to 50 were superior to the secondary batteries in Comparative Examples 17 and 18 in the utilization, the large-current discharge characteristic, and the recovery ratio after storage. In particular, comparing the characteristics shown in Table 19 with those shown in Tables 17 and 18 more clearly indicates that a nickel-hydrogen secondary battery having improved battery characteristics can be obtained by the use of a positive electrode in which a large quantity of electricity passes when the voltage drops or which has a good voltage recovery characteristic.

EXAMPLES 51–56 & COMPARATIVE EXAMPLES 19–24

Pastes (paste Nos. are shown in Table 20 below) having the compositions listed in Table 1 presented earlier were applied on and filled in nickel foamed substrates (CELMET (tradename); available from Sumitomo Electric Industries, Ltd.) having a three-dimensional structure, and dried by leaving the substrates in a hot-air dryer. After being sufficiently dried, each resultant substrate was pressed until a predetermined thickness was obtained by using a two-stage rolling mill and finally punched into dimensions of 40 mm×65 mm, thereby manufacturing a paste type positive electrode. In the manufacture of this positive electrode, the application, filling, and pressing of the paste were so adjusted that the theoretical capacity calculated on the basis of the nickel hydroxide content obtained from the final weight was approximately 1050 mAh.

1 g of KETJEN BLACK and, as a binder, 0.1 g of CMC, 0.3 g of sodium polyacrylate, and 2 g of PTFE were added to 100 g of $LmNi_{4.0}Co_{0.4}Mn_{0.3}Al_{0.3}$ (Lm; lanthanum-rich misch metal having the composition described previously) and well mixed. Water was added to the resultant mixture to prepare a paste of a hydrogen-absorbing alloy. The paste was applied on the two surfaces of a punched metal and dried by leaving the punched metal in a hot-air dryer. After being sufficiently dried, the resultant was pressed until a predetermined thickness was obtained by using a two-stage rolling mill and finally punched into dimensions of 40 mm×105 mm by using a punching press, thereby manufacturing a hydrogen-absorbing alloy negative electrode. In the manufacture of this negative electrode, the application, filling, and pressing of the paste were so adjusted that the theoretical capacity calculated on the basis of the hydrogen-absorbing alloy content obtained from the final weight was approximately 2000 mAh.

These electrodes were wound while being insulated by a separator made from polypropylene nonwoven fabric to manufacture electrode group. These electrode group were inserted into AA-size battery cases, and an electrolyte prepared by mixing 7.5N potassium hydroxide and 0.5N lithium hydroxide was injected into these cases. Each resultant case was sealed by a sealing plate with a safety valve whose operating pressure was 15 $kgf/cm^2$. In this manner AA-size nickel-hydrogen secondary batteries having the structure shown in FIG. 1 described above were assembled.

After lead wires were connected to the secondary batteries thus obtained, these batteries were initially charged under the conditions shown in Table 20 below. These secondary batteries thus initially charged were discharged by 1 C until the battery voltage decreased to 0.8 V and subjected to aging charge/discharge. The capacity obtained when discharge was finally performed in this aging charge/discharge was evaluated as the initial capacity. The obtained initial capacities and utilizations are also shown in Table 20.

TABLE 20

| | Theoretical capacity (mAh) | Paste No. | Initial charge method | Initial capacity (utilization) |
|---|---|---|---|---|
| Example 51 | 1050 | 2 | High-temperature charge | 1081 mAh (103%) |
| Example 52 | 1044 | 2 | " | 1086 mAh (104%) |
| Comparative Example 19 | 1052 | 2 | Normal charge | 978 mAh (93%) |
| Comparative Example 20 | 1048 | 2 | " | 996 mAh (95%) |
| Example 53 | 1058 | 3 | High-temperature charge | 1143 mAh (108%) |
| Example 54 | 1054 | 3 | " | 1149 mAh (109%) |
| Comparative Example 21 | 1050 | 3 | Normal charge | 1019 mAh (97%) |
| Comparative Example 22 | 1047 | 3 | " | 984 mAh (94%) |
| Example 55 | 1061 | 4 | High-temperature charge | 1125 mAh (106%) |
| Example 56 | 1052 | 4 | " | 1105 mAh (105%) |
| Comparative Example 23 | 1049 | 4 | Normal charge | 955 mAh (91%) |
| Comparative Example 24 | 1059 | 4 | " | 943 mAh (89%) |

To evaluate the large-current discharge characteristics of these secondary batteries, the batteries were charged by 0.3 C for five hours and discharged by 3 C until the cell voltage decreased to 0.8 V, and the capacity of each battery was measured. In addition, subsequently to this measurement odd-numbered secondary batteries in these examples and comparative examples were shorted with a 1-kΩ resistance, left to stand at room temperature for one month, in order to simulate conditions where these secondary batteries were left unused after being incorporated into electronic apparatuses. Subsequently, these batteries were subjected to the aging charge/discharge described above, and the capacity of each cell was measured. Each measured capacity was divided by the corresponding initial capacity to obtain the recovery characteristic after storage. The results are shown in Table 21 below.

TABLE 21

| | Large-current discharge characteristic | Recovery ratio after storage |
|---|---|---|
| Example 51 | 89% | 94% |
| Example 52 | 87% | — |
| Comparative Example 19 | 78% | 78% |
| Comparative Example 20 | 80% | — |
| Example 53 | 93% | 97% |
| Example 54 | 91% | — |
| Comparative Example 21 | 83% | 83% |
| Comparative Example 22 | 81% | — |
| Example 55 | 94% | 96% |
| Example 56 | 91% | — |
| Comparative Example 23 | 85% | 85% |
| Comparative Example 24 | 83% | — |

Meanwhile, even-numbered batteries in these examples and comparative examples were tested as follows. That is, after being discharged to 0.8 V by 1 C, each battery was placed in a constant temperature bath at 45° C. The battery was shorted with a 2-Ω resistance, and the quantity of passing electricity while the voltage was dropping was measured. In addition, after the battery was left to stand for two days, the resistance was disconnected, and the voltage recovery time was measured. The results are shown in Table 22 below.

TABLE 22

| | Cobalt compound electrochemical capacity (mAh) | Passing electricity quantity (mAh) during voltage drop (ratio to cobalt compound electrochemical capacity) | Voltage recovery time |
|---|---|---|---|
| Example 52 | 64.5 | 16.2 (25.0%) | 0 h 51 min |
| Comparative Example 20 | 64.9 | 8.2 (12.6%) | 5 h 03 min |
| Example 54 | 105.2 | 32.2 (30.1%) | 0 h 38 min |
| Comparative Example 22 | 104.5 | 15.7 (15.0%) | 3 h 40 min |
| Example 56 | 165.7 | 67.8 (40.9%) | 0 h 23 min |
| Comparative Example 24 | 166.8 | 25.0 (15.0%) | 2 h 11 min |

As shown in Table 20, Table 21 and Table 22, even in Examples 51 and 52 and Comparative Examples 19 and 20 different in the cobalt compound content, it was possible to obtain alkaline secondary batteries having a high utilization, a good large-current discharge characteristic, and a high recovery ratio after storage by the use of a positive electrode improved in the passing electricity quantity during voltage drop or the voltage recovery characteristic. Also, even if different cobalt compounds were used as in Examples 51 to 56 and Comparative Examples 19 to 24, it was possible to obtain alkaline secondary batteries improved in the above various characteristics by the use of a positive electrode improved in the passing electricity quantity during voltage drop or the voltage recovery characteristic.

As has been described in detail above, the present invention can provide an alkaline secondary battery manufacturing method, an alkaline secondary battery nickel electrode, and an alkaline secondary battery capable of simultaneously obtaining a large capacity, improving the large-current discharge characteristic, and suppressing a decrease in the capacity after storage.

EXAMPLE 57

Manufacture of paste type negative electrode 0.125 parts by weight of sodium polyacrylate, 0.125 parts by weight of carboxymethylcellulose, 0.25 parts by weight of polytetrafluoroethylene, 1 part by weight of carbon black, and 60 parts by weight of water were added and mixed to 100 parts by weight of a hydrogen-absorbing alloy powder of $LmNi_{4.0}Co_{0.4}Mn_{0.3}Al_{0.3}$ (Lm; lanthanum-rich misch metal having the composition described previously). The resultant mixture was kneaded while being applied with a shearing stress, thereby preparing a paste. The paste was applied on a punched metal and dried, and the resultant was pressed to manufacture a negative electrode.

Manufacture of paste type positive electrode

A paste was prepared by kneading 90 parts by weight of a nickel hydroxide powder, 10 parts by weight of cobalt monoxide, 0.25 parts by weight of sodium polyacrylate, 0.25 parts by weight of carboxymethylcellulose, 3.0 parts by weight of polytetrafluoroethylene, and 30 parts by weight of water. This paste was applied on and filled in a conductive substrate made of nickel fibers and dried. The resultant was pressed to manufacture a paste type positive electrode.

A separator made of polypropylene nonwoven fabric which was given hydrophilic nature was arranged between the positive and negative electrodes thus obtained. Each resultant electrode group was placed in a metal case, and an electrolyte primarily consisting of potassium hydroxide was contained in the case. By further using members such as metal covers, AA-size cylindrical nickel-hydrogen secondary batteries having the structure shown in FIG. 1 were assembled.

Figure 4:
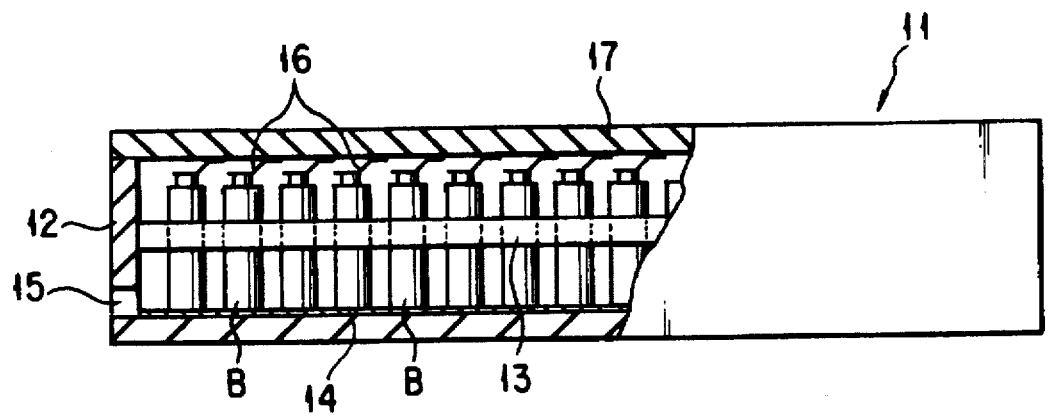
FIG. 4 is a partially cutaway front view showing an initial charge battery case used in Example 57 of the present invention.

A plurality of nickel-hydrogen secondary batteries B thus assembled were accommodated in an initial charge battery case 11 shown in FIG. 4. The case 11 consists of a case main body 12, four support plates 13, a terminal unit 14, heating water supply ports 15, and a cover 17 attached to the main body 12. The main body 12 has an open upper portion and is made from an insulating material such as a heat-resistant resin. The support plates 13 are arranged in the main body 12 to partition the interior of the main body 12 into five long and narrow spaces. The terminal unit 14 is formed on the inner bottom surface of the main body 12 and connected to the negative electrodes of the secondary batteries B. The heating water supply ports 15 are formed in the lower portions of the opposing side walls of the main body 12. The cover 17 has elastic terminals 16 formed on its inner surface and connected to the positive electrodes of the secondary batteries B, and is made from an insulating material such as a heat-resistant resin. Note that the terminal unit 14 and the elastic terminals 16 are connected to an external power supply (not shown).

Figure 5:
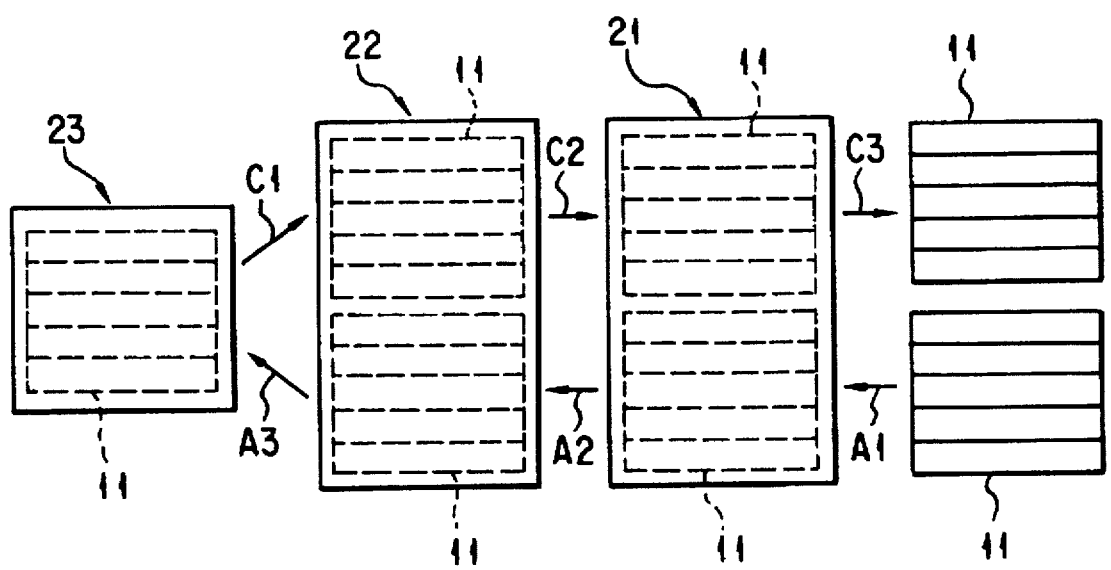
FIG. 5 is a plan view showing an initial charge processor used in Example 57 of the present invention.

FIG. 5 is a plan view showing an initial charge processor. In FIG. 5, reference numeral 21 denotes a first constant temperature bath set at a temperature of 40° C.; 22, a second constant temperature bath arranged on the left of the first constant temperature bath 21 and set at a temperature of 60° C.; and 23, a third constant temperature bath arranged on the left of the second temperature bath 22 and set at a temperature of 80° C. Hot water is contained as a heating medium in the first to third constant temperature baths 21 to 23. Each of the first and second constant temperature baths 21 and 22 has a space capable of accommodating two cases 11. The third constant temperature bath 23 has a space capable of accommodating one case 11. The initial charge processor with this structure was used to perform high-temperature initial charge for the nickel-hydrogen secondary batteries B in the initial charge battery case 11, FIG. 4.

More specifically, an initial charge battery case 11 containing a plurality of nickel-hydrogen secondary batteries B was conveyed into the first constant temperature bath 21 as indicated by an arrow $A_1$, and the secondary batteries were heated to 40° C. by flowing heating water into the case main body 12 through the heating water supply ports 15 of the main body 12. The case 11 was the conveyed into the second constant temperature bath 22 as indicated by an arrow $A_2$, and the secondary batteries B in the case 11 were heated to 60° C. Subsequently, the case 11 was conveyed into the third constant temperature bath 23 as indicated by an arrow $A_3$. When the case 11 was heated to 80° C., initial charge was performed by applying a voltage with a predetermined current value to the secondary batteries B in the case 11 through the terminal unit 14 and the elastic terminals 16. The case 11 containing the initially charged secondary batteries was sequentially conveyed to the second and first constant temperature baths 22 and 21 as indicated by arrows $C_1$ and $C_2$, respectively, and then conveyed to the outside as indicated by an arrow $C_3$. While the case 11 was conveyed through the second and first constant temperature baths 22 and 21, heat exchange was performed between the initially charged secondary batteries in the case 11 and secondary batteries not initially charged in other cases 11 conveyed to the first and second constant temperature baths 21 and 22 as indicated by the arrows $A_1$ and $A_2$. Consequently, the initially charged secondary batteries in the case 11 were first cooled to 60° C. and then to 40° C., and the secondary batteries not initially charged in the other case 11 were first heated to 40° C. and then to 60° C.

As described above, an initial charge battery case 11, FIG. 4, containing a plurality of secondary batteries were conveyed step by step to the first to third constant temperature baths 21 to 23, and high-temperature initial charge was performed. Thereafter, the case 11 was conveyed backward to the second and first constant temperature baths 22 and 21, cooled, and removed to the outside. Consequently, it was possible to prevent a rise in the initial charge atmosphere temperature and efficiently heat secondary batteries before initial charge, and so the energy could be effectively used.

In the above examples, high-temperature initial charge of secondary batteries was done by using the initial charge processor, FIG. 5, having three constant temperature baths. However, the secondary battery high-temperature initial charge can also be performed by using an initial charge processor having four or more constant temperature baths. If such an initial charge processor is used, it is possible to more efficiently cool initially charged secondary batteries and heat secondary batteries not initially charged.

Examples 1 to 57 are explained by taking a cylindrical nickel-hydrogen secondary battery as an example, which was manufactured by spirally winding a negative electrode and a positive electrode with a separator interposed between them and accommodating the resultant electrode group in a closed-end cylindrical case. However, the present invention is similarly applicable to a rectangular nickel-hydrogen secondary battery manufactured by stacking negative electrodes and positive electrodes with separators interposed between them and accommodating the resultant stacked product in a closed-end rectangular case.

As has been described in detail above, the present invention can provide an alkaline secondary battery manufacturing method, an alkaline secondary battery nickel electrode, and an alkaline secondary battery capable of simultaneously obtaining a large capacity, improving the large-current discharge characteristic, and suppressing a decrease in the capacity after stand. Also, another alkaline secondary battery manufacturing method according to the present invention can achieve remarkable effects, e.g., can effectively use thermal energy which is used when initial charge is performed at a high temperature and hence can efficiently manufacture high-performance nickel-hydrogen secondary batteries.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of manufacturing an alkaline secondary battery comprising a positive electrode containing a nickel compound and a cobalt compound, negative electrode and an alkaline electrolyte, said method comprising the step of performing initial charging which comprises a charging process of supplying a current I (mA) satisfying the following Inequality (1):

$$50<(T\times C^2)/(I\times S)<2000 \quad (1)$$

where C is an electrochemical capacity (mAh) of said cobalt compound contained in said positive electrode, which is calculated on the basis of an electrochemical equivalent of said cobalt compound, T is a temperature (°C.) at which said charging process is performed, and S is an area (cm$^2$) of said positive electrode.

2. The method according to claim 1, wherein said charging process supplies a current I (mA) satisfying the following Inequality (2):

$$200<(T\times C^2)/(I\times S)<2000 \quad (2)$$

3. The method according to claim 1, wherein the temperature (T) at which said charging process is performed is 40° to 120° C.

4. The method according to claim 1, wherein said charging process is maintained until a charged electricity quantity Q (mAh) reaches a range of Inequality (3) below:

$$0.1<Q/C<3 \quad (3)$$

5. The method according to claim 1, wherein said negative electrode contains a hydrogen-absorbing alloy.

6. The method according to claim 5, wherein said hydrogen-absorbing alloy is represented by $RNi_{t-x-y}Co_xA_y$ wherein R represents at least one element selected from the group consisting of rare earth elements containing La and Y, A represents at least one element selected from the group consisting of Al, Mn, Ti, Cu, Zn, Zr, Cr, and P, and t, x, and y represent atomic ratios satisfying $4.5\leq t\leq 5.5$, $x\geq 0.4$, and $0\leq y\leq 2.0$, respectively.

7. A method of manufacturing an alkaline secondary battery comprising a positive electrode containing a nickel compound and a cobalt compound, a negative electrode and an alkaline electrolyte, said method comprising the step of performing initial charging which comprises a charging process of supplying a current I (mA) satisfying the following Inequality (1), and a process of lowering a temperature after a charged electricity quantity Q (mAh) reaches a range of Inequality (3) below:

$$50<(T\times C^2)/(T\times S)<2000 \quad (1)$$

$$0.1<Q/C<3 \quad (3)$$

where C is an electrochemical capacity (mAh) of said cobalt compound contained in said positive electrode, which is calculated on the basis of an electrochemical equivalent of said cobalt compound, T is a temperature (°C.) at which said charging process is performed, and S is an area (cm$^2$) of said positive electrode.

8. The method according to claim 7, wherein said charging process supplies a current I (mA) satisfying the following Inequality (2):

$$200<(T\times C^2)/(I\times S)<2000 \quad (2)$$

9. The method according to claim 7, wherein the temperature (T) at which said charging process is performed is 40° to 120° C.

10. The method according to claim 7, wherein said negative electrode contains a hydrogen-absorbing alloy.

11. The method according to claim 10, wherein said hydrogen-absorbing alloy is represented by $RNi_{t-x-y}Co_xA_y$ wherein R represents at least one element selected from the group consisting of rare earth elements containing La and Y, A represents at least one element selected from the group consisting of Al, Mn, Ti, Cu, Zn, Zr, Cr, and P, and t, x, and y represent atomic ratios satisfying $4.5\leq t\leq 5.5$, $x\geq 0.4$, and $0\leq y\leq 2.0$, respectively.

12. A method of manufacturing an alkaline secondary battery comprising a positive electrode containing a nickel compound and a cobalt compound, a negative electrode and an alkaline electrolyte, said method comprising the step of performing initial charging which comprises a charging process of supplying a current I (mA) satisfying the following Inequality (1), and a process of increasing the current after a charged electricity quantity Q (mAh) reaches a range of Inequality (3) below:

$$50<(T\times C^2)/(I\times S)<2000 \quad (1)$$

$$0.1<Q/C<3 \quad (3)$$

where C is an electrochemical capacity (mAh) of said cobalt compound contained in said positive electrode, which is calculated on the basis of an electrochemical equivalent of said cobalt compound, T is a temperature (°C.) at which said charging process is performed, and S is an area (cm$^2$) of said positive electrode.

13. The method according to claim 12, wherein said charging process supplies a current I (mA) satisfying the following Inequality (2):

$$200<(T\times C^2)/(I\times S)<2000 \quad (2)$$

14. The method according to claim 12, wherein the temperature (T) at which said charging process is performed is 40° to 120° C.

15. The method according to claim 12, wherein said negative electrode contains a hydrogen-absorbing alloy.

16. The method according to claim 15, wherein said hydrogen-absorbing alloy is represented by $RNi_{t-x-y}Co_xA_y$ wherein R represents at least one element selected from the group consisting of rare earth elements containing La and Y, A represents at least one element selected from the group consisting of Al, Mn, Ti, Cu, Zn, Zr, Cr, and P, and t, x, and y represent atomic ratios satisfying $4.5\leq t\leq 5.5$, x0.4, and $0\leq y\leq 2.0$, respectively.

17. A method of manufacturing an alkaline secondary battery comprising a positive electrode containing a nickel compound and a cobalt compound, a negative electrode and an alkaline electrolyte, said method comprising the step of performing initial charging which comprises a charging process of supplying a current I (mA) satisfying the following Inequality (1), and a process of lowering a temperature and increasing the current after a charged electricity quantity Q (mAh) reaches a range of Inequality (3) below:

$$50<(T\times C^2)/(I\times S)<2000 \quad (1)$$

$$0.1<Q/C<3 \quad (3)$$

where C is an electrochemical capacity (mAh) of said cobalt compound contained in said positive electrode, which is calculated on the basis of an electrochemical equivalent of said cobalt compound, T is a temperature (°C.) at which said charging process is performed, and S is an area (cm$^2$) of said positive electrode.

18. The method according to claim 17, wherein said charging process supplies a current I (mA) satisfying the following Inequality (2):

$$200 < (T \times C^2)/(I \times S) < 2000 \qquad (2)$$

19. The method according to claim 17, wherein the temperature (T) at which said charging process is performed is 40° to 120° C.

20. The method according to claim 17, wherein said negative electrode contains a hydrogen-absorbing alloy.

21. The method according to claim 20, wherein said hydrogen-absorbing alloy is represented by $RNi_{t-x-y}Co_xA_y$, wherein R represents at least one element selected from the group consisting of rare earth elements containing La and Y, A represents at least one element selected from the group consisting of Al, Mn, Ti, Cu, Zn, Zr, Cr, and P, and $\underline{t}$, $\underline{x}$, and $\underline{y}$ represent atomic ratios satisfying $4.5 \leq t \leq 5.5$, $x \geq 0.4$, and $0 \leq y \leq 2.0$, respectively.

22. An alkaline secondary battery positive electrode containing a nickel compound and a cobalt compound, wherein assuming that said cobalt compound is cobalt oxyhydroxide and an electrochemical capacity of said cobalt oxyhydroxide calculated on the basis of an electrochemical equivalent of said cobalt oxyhydroxide is C (mAh), when said positive electrode is discharged with a current value of C/100 (mA), said positive electrode has a discharge capacity of C/20 (mAh) or more while a positive electrode potential decreases from 200 mV to –200 mV with respect to a mercury/mercuric oxide reference electrode.

23. The positive electrode according to claim 22, wherein the discharge capacity is not less than C/10.

24. An alkaline secondary battery comprising:
a positive electrode containing a nickel compound and a cobalt compound;
a negative electrode; and
an alkaline electrolyte,
wherein assuming that said cobalt compound is cobalt oxyhydroxide and an electrochemical capacity of said cobalt oxyhydroxide calculated on the basis of an electrochemical equivalent of said cobalt oxyhydroxide is C (mAh), when said positive electrode is discharged with a current value of C/100 (mA), said positive electrode has a discharge capacity of C/20 (mAh) or more while a positive electrode potential decreases from 200 mV to –200 mV with respect to a mercury/mercuric oxide reference electrode.

25. The secondary battery according to claim 24, wherein the discharge capacity is not less than C/10.

26. The secondary battery according to claim 25, wherein said negative electrode contains a hydrogen-absorbing alloy.

27. The secondary battery according to claim 26, wherein said hydrogen-absorbing alloy is represented by $RNi_{t-x-y}Co_xA_y$, wherein R represents at least one element selected from the group consisting of rare earth elements containing La and Y, A represents at least one element selected from the group consisting of Al, Mn, Ti, Cu, Zn, Zr, Cr, and P, and $\underline{t}$, $\underline{x}$, and $\underline{y}$ represent atomic ratios satisfying $4.5 \leq t \leq 5.5$, $x \geq 0.4$, and $0 \leq y \leq 2.0$, respectively.

28. An alkaline secondary battery comprising:
a positive electrode containing a nickel compound and a cobalt compound;
a negative electrode; and
an alkaline electrolyte,
wherein assuming that said cobalt compound is cobalt oxyhydroxide, when said battery is discharged at 45° C. by causing a short using a 2-Ω resistance, said battery has a quantity of electricity which flows while a voltage decreases from 100 mV to 20 mV and which is not less than 20% of an electrochemical capacity of said cobalt oxyhydroxide calculated on the basis of an electrochemical equivalent of said cobalt oxyhydroxide.

29. The secondary battery according to claim 28, wherein the quantity of electricity is not less than 30% of the electrochemical capacity.

30. The secondary battery according to claim 28, wherein said negative electrode contains a hydrogen-absorbing alloy.

31. The secondary battery according to claim 30, wherein said hydrogen-absorbing alloy is represented by $RNi_{t-x-y}Co_xA_y$, wherein R represents at least one element selected from the group consisting of rare earth elements containing La and Y, A represents at least one element selected from the group consisting of Al, Mn, Ti, Cu, Zn, Zr, Cr, and P, and $\underline{t}$, $\underline{x}$, and $\underline{y}$ represent atomic ratios satisfying $4.5 \leq t \leq 5.5$, $x \geq 0.4$, and $0y \geq 2.0$, respectively.

32. An alkaline secondary battery comprising:
a positive electrode containing a nickel compound and a cobalt compound;
a negative electrode; and
an alkaline electrolyte,
wherein said battery has a recovery voltage which rises from 10 mV to 30 mV within one hour or less after said battery has been discharged at 45° C. by causing a short using a 2-Ω resistance for 48 hours and rendered not short-circuited at 25° C.

33. The secondary battery according to claim 32, wherein the time within which a voltage rises from 10 mV to 30 mV is not more than 45 minutes.

34. The secondary battery according to claim 33, wherein said negative electrode contains a hydrogen-absorbing alloy.

35. The secondary battery according to claim 34, wherein said hydrogen-absorbing alloy is represented by $RNi_{t-x-y}Co_xA_y$, wherein R represents at least one element selected from the group consisting of rare earth elements containing La and Y, A represents at least one element selected from the group consisting of Al, Mn, Ti, Cu, Zn, Zr, Cr, and P, and $\underline{t}$, $\underline{x}$, and $\underline{y}$ represent atomic ratios satisfying $4.5 \leq t \leq 5.5$, $x \geq 0.4$, and $0 \leq y \leq 2.0$, respectively.

36. A method of manufacturing an initially charged alkaline secondary battery, comprising the steps of:
preparing an alkaline secondary battery comprising a positive electrode containing a nickel compound and a cobalt compound, a negative electrode and an alkaline electrolyte,
performing initial charging of said battery at a high temperature of 40° to 120° C.; and
performing heat exchange between said initially charged battery and a battery to be initially charged, thereby cooling said initially charged battery and heating said battery to be initially charged.

* * * * *